US012724294B2

(12) United States Patent
Van Heugten et al.

(10) Patent No.: US 12,724,294 B2
(45) Date of Patent: Sep. 1, 2026

(54) OXYGEN PERMEABLE CONTACT LENS

(71) Applicant: e-Vision Smart Optics, Inc., Sarasota, FL (US)

(72) Inventors: Anthony Van Heugten, Sarasota, FL (US); Harry Milton, Sarasota, FL (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 0 days.

(21) Appl. No.: 19/122,107

(22) PCT Filed: Feb. 5, 2025

(86) PCT No.: PCT/US2025/014630
§ 371 (c)(1),
(2) Date: Apr. 17, 2025

(87) PCT Pub. No.: WO2025/171037
PCT Pub. Date: Aug. 14, 2025

(65) Prior Publication Data

US 2026/0110921 A1 Apr. 23, 2026

Related U.S. Application Data

(60) Provisional application No. 63/549,672, filed on Feb. 5, 2024.

(51) Int. Cl.

| | |
|---|---|
| ***G02C 7/04*** | (2006.01) |
| ***B29D 11/00*** | (2006.01) |
| ***G02C 7/08*** | (2006.01) |
| ***G02C 13/00*** | (2006.01) |
| ***G02F 1/1333*** | (2006.01) |
| ***G02F 1/1335*** | (2006.01) |
| ***G02F 1/1343*** | (2006.01) |
| *G02F 1/1339* | (2006.01) |

(52) U.S. Cl.
CPC ........ *G02C 7/083* (2013.01); *B29D 11/00807* (2013.01); *G02C 7/049* (2013.01); *G02C 13/001* (2013.01); *G02F 1/133305* (2013.01); *G02F 1/133526* (2013.01); *G02F 1/13439* (2013.01); *G02F 1/13392* (2013.01)

(58) Field of Classification Search
None
See application file for complete search history.

(56) References Cited

U.S. PATENT DOCUMENTS

| | | | | |
|---|---|---|---|---|
| 2015/0077661 | A1 | 3/2015 | Pugh et al. | |
| 2018/0088351 | A1 * | 3/2018 | Kennedy ................ | G02C 7/041 |
| 2018/0217402 | A1 | 8/2018 | Larmagnac et al. | |
| 2018/0224671 | A1 | 8/2018 | Lemoff et al. | |
| 2020/0201073 | A1 * | 6/2020 | Lemoff ..................... | G02F 1/29 |

(Continued)

OTHER PUBLICATIONS

International Search Report and Written Opinion in International App. No. PCT/US2025/014630 mailed Mar. 25, 2025, 17 pages.

*Primary Examiner* — Darryl J Collins
(74) *Attorney, Agent, or Firm* — Smith Baluch LLP

(57) ABSTRACT

Methods and devices for an oxygen permeable liquid crystal contact lens are disclosed herein. An oxygen permeable liquid crystal contact lens may include a coating. The coating may be made of one or more layers of an oxygen non-permeable material. The coating may be modified to allow oxygen to permeate though the liquid crystal contact lens to a mammalian eye.

24 Claims, 18 Drawing Sheets

(56) References Cited

U.S. PATENT DOCUMENTS

| | | | | |
|---|---|---|---|---|
| 2020/0201078 | A1 | 6/2020 | Kuiper et al. | |
| 2021/0364823 | A1 | 11/2021 | Legerton et al. | |
| 2023/0258960 | A1 | 8/2023 | Melakari et al. | |
| 2025/0251619 | A1 * | 8/2025 | Oag ......................... | G02C 7/04 |

* cited by examiner

OXYGEN PERMEABLE CONTACT LENS

CROSS-REFERENCE TO RELATED APPLICATION(S)

This application is a U.S. national-stage application, under 35 U.S.C. 371, of International Application No. PCT/US2025/014630, filed Feb. 5, 2025, which in turn claims the priority benefit, under 35 U.S.C. § 119(e), of U.S. Application No. 63/549,672, filed on Feb. 5, 2024, which is incorporated herein by reference in its entirety.

BACKGROUND

It is possible now to make a contact lens that includes a layer of liquid crystal material that enables the contact lens's optical power to be adjusted electronically. This liquid crystal layer is sealed between two transparent substrates. At least one of the substrate surfaces facing the liquid crystal layer may be patterned, e.g., in the shape of a Fresnel lens or other refractive or diffractive structure, to provide static optical power. The substrates may also be curved to provide static optical power. The substrate surfaces may also be coated with additional layers, including conductive and insulating materials for actuating the liquid crystal material with an electric field. However, one of the challenges in making a liquid crystal contact lens is how to allow oxygen to pass through the contact lens from the atmosphere to the cornea to prevent oxygen starvation of the cornea since the conductive and insulating materials may be oxygen non-permeable.

SUMMARY

In some aspects, the techniques described herein relate to a liquid crystal contact lens including a first oxygen-permeable substrate, wherein a first side of the first oxygen-permeable substrate is configured to be placed on a mammalian eye, a second oxygen-permeable substrate configured to be placed proximate to a second side of the first oxygen-permeable substrate to form a cavity between the first oxygen-permeable substrate and the second oxygen-permeable substrate, a liquid crystal material disposed within the cavity, and an oxygen-impermeable coating disposed on the second side of the first oxygen-permeable substrate facing the cavity, wherein a portion of the oxygen-impermeable coating has been removed to allow oxygen to travel directly between the liquid crystal material and the first oxygen-permeable substrate and to permeate through the liquid crystal contact lens to the mammalian eye.

In some aspects, the techniques described herein relate to a liquid crystal contact lens, wherein the oxygen-impermeable coating includes a first insulating layer disposed directly on the second side of the first oxygen-permeable substrate, a conductive layer disposed on the first insulating layer, and a second insulating layer disposed on the conductive layer.

In some aspects, the techniques described herein relate to a liquid crystal contact lens, wherein the first insulating layer and the second insulating layer each include silicon dioxide ($SiO_2$).

In some aspects, the techniques described herein relate to a liquid crystal contact lens, wherein the conductive layer includes indium tin oxide (ITO).

In some aspects, the techniques described herein relate to a liquid crystal contact lens, wherein the oxygen-impermeable coating further includes a liquid-crystal alignment layer disposed on the second insulating layer.

In some aspects, the techniques described herein relate to a liquid crystal contact lens, wherein at least one of the first oxygen-permeable substrate or the second oxygen-permeable substrate include a surface relief diffractive pattern.

In some aspects, the techniques described herein relate to a liquid crystal contact lens, wherein the surface relief diffractive pattern includes a Fresnel lens pattern.

In some aspects, the techniques described herein relate to a liquid crystal contact lens, wherein the portion of the oxygen-impermeable coating that has been removed includes at least one region between a pair of adjoining rings in the Fresnel lens pattern.

In some aspects, the techniques described herein relate to a liquid crystal contact lens, wherein the portion of the oxygen-impermeable coating that has been removed includes a plurality of ablation zones.

In some aspects, the techniques described herein relate to a liquid crystal contact lens, wherein the plurality of ablation zones includes about 10 to about 1000 ablation zones.

In some aspects, the techniques described herein relate to a liquid crystal contact lens, wherein the oxygen-impermeable coating is a first oxygen-impermeable coating, and further including a second oxygen-impermeable coating disposed on a first side of the second oxygen-permeable substrate facing the cavity, wherein a portion of the second oxygen-impermeable coating has been removed to allow oxygen to travel directly between the liquid crystal material and the second oxygen-permeable substrate and to permeate through the liquid crystal contact lens to the mammalian eye.

In some aspects, the techniques described herein relate to a method of manufacturing an oxygen permeable liquid crystal contact lens, the method including applying a coating to a surface of a first oxygen-permeable substrate configured to be placed on a mammalian eye, wherein the coating includes an oxygen-impermeable material, removing a portion of the coating to allow oxygen to permeate through the coating to the first oxygen-permeable substrate and through the contact lens to the mammalian eye, forming a cavity between the first oxygen-permeable substrate and a second oxygen-permeable substrate, and disposing a liquid crystal material within the cavity facing the coating.

In some aspects, the techniques described herein relate to a method, wherein the applying the coating includes disposing a first insulating layer on the surface of the first oxygen-permeable substrate, disposing a conductive layer on the first insulating layer, and disposing a second insulating layer on the conductive layer.

In some aspects, the techniques described herein relate to a method, wherein applying the coating further includes disposing a liquid-crystal alignment layer on the second insulating layer.

In some aspects, the techniques described herein relate to a method, wherein the removing the portion of the coating includes at least one of laser etching, electron beam etching, ultrasonic shaking, ablating, ion milling, or reactive ion etching the coating.

In some aspects, the techniques described herein relate to a method, further including patterning a surface relief pattern diffractive pattern on the first oxygen-permeable substrate prior to applying the coating to the first oxygen-permeable substrate.

In some aspects, the techniques described herein relate to a method, wherein the coating is a first coating, and further including, before forming the cavity applying a second coating to a surface of the second oxygen-permeable substrate, wherein the second coating includes additional oxygen-impermeable material, and removing a portion of the second coating to allow oxygen to permeate through the coating to the second oxygen-permeable substrate and through the contact lens to the mammalian eye.

In some aspects, the techniques described herein relate to a method of manufacturing an oxygen permeable liquid crystal contact lens, the method including disposing a first conductive layer on a first portion of a first oxygen-permeable substrate configured to be placed on a mammalian eye, wherein a second portion of the first oxygen-permeable substrate is exposed to allow oxygen to permeate through the contact lens to the mammalian eye, disposing a second conductive layer on a first portion of a second oxygen-permeable substrate configured to be placed on a mammalian eye, wherein a second portion of the first oxygen-permeable substrate is exposed to allow oxygen to permeate through the contact lens to the mammalian eye, forming a cavity between the first oxygen-permeable substrate and the second oxygen-permeable substrate, disposing a plurality of spacer beads within the cavity, wherein the plurality of spacer beads are configured to prevent the first conductive layer from contacting the second conductive layer, and disposing a liquid crystal material within the cavity.

In some aspects, the techniques described herein relate to a method, further including before forming the cavity disposing a liquid-crystal alignment layer on the first conductive layer or the second conductive layer.

In some aspects, the techniques described herein relate to a method, wherein the first portion of the first oxygen-permeable substrate and the first portion of a second oxygen-permeable substrate do not overlap to allow oxygen to travel directly through the first oxygen-permeable substrate, the liquid crystal material, and the second oxygen-permeable substrate to the mammalian eye.

In some aspects, the techniques described herein relate to a liquid crystal contact lens including a first oxygen-permeable substrate, wherein a first side of the first oxygen-permeable substrate is configured to be placed on a mammalian eye, a second oxygen-permeable substrate configured to be placed proximate to a second side of the first oxygen-permeable substrate to form a cavity between the first oxygen-permeable substrate and the second oxygen-permeable substrate, a liquid crystal material disposed within the cavity, and a porous coating disposed on the second side of the first oxygen-permeable substrate facing the cavity, wherein the porous coating includes at least one oxygen non-permeable material with a plurality of holes extending through the porous coating to allow oxygen to travel between the liquid crystal material and the first oxygen-permeable substrate via the plurality of holes.

In some aspects, the techniques described herein relate to a liquid crystal contact lens, wherein the porous coating is a first porous coating, and further including a second porous coating disposed on a first side of the second oxygen-permeable substrate facing the cavity, wherein the second porous coating includes at least one oxygen non-permeable material with a plurality of holes extending through the second porous coating to allow oxygen to travel between the liquid crystal material and the second oxygen-permeable substrate via the plurality of holes.

In some aspects, the techniques described herein relate to a method of manufacturing an oxygen permeable liquid crystal contact lens, the method including applying an oxygen non-permeable material to a surface of a first oxygen-permeable substrate configured to be placed on a mammalian eye, patterning the oxygen non-permeable material with a plurality of holes extending through the oxygen non-permeable material to the surface of the first oxygen-permeable substrate, forming a cavity between the first oxygen-permeable substrate and a second oxygen-permeable substrate, and disposing a liquid crystal material within the cavity facing the oxygen non-permeable material.

In some aspects, the techniques described herein relate to a method, wherein the patterning the oxygen non-permeable material includes ablating the oxygen non-permeable material.

In some aspects, the techniques described herein relate to a method, wherein the oxygen non-permeable material is a first oxygen non-permeable material, and further including, before forming the cavity applying a second oxygen non-permeable material to a surface of the second oxygen-permeable substrate, and patterning the second oxygen non-permeable material with a plurality of holes extending through the second oxygen non-permeable material to the surface of the second oxygen-permeable substrate.

In some aspects, the techniques described herein relate to a liquid crystal contact lens including a first oxygen-permeable substrate, wherein a first side of the first oxygen-permeable substrate is configured to be placed on a mammalian eye, a second oxygen-permeable substrate configured to be placed proximate to a second side of the first oxygen-permeable substrate to form a cavity between the first oxygen-permeable substrate and the second oxygen-permeable substrate, a liquid crystal material disposed within the cavity, and a coating including a first insulating layer disposed directly on the second side of the first oxygen-permeable substrate facing the cavity, a conductive layer disposed on the first insulating layer, a second insulating layer disposed on the conductive layer, and a plurality of pores extending through the first insulating layer, the conductive layer, and the second insulating layer to allow oxygen to travel through the second oxygen-permeable substrate, the liquid crystal material, and the first oxygen-permeable substrate via the plurality of pores to reach the mammalian eye.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
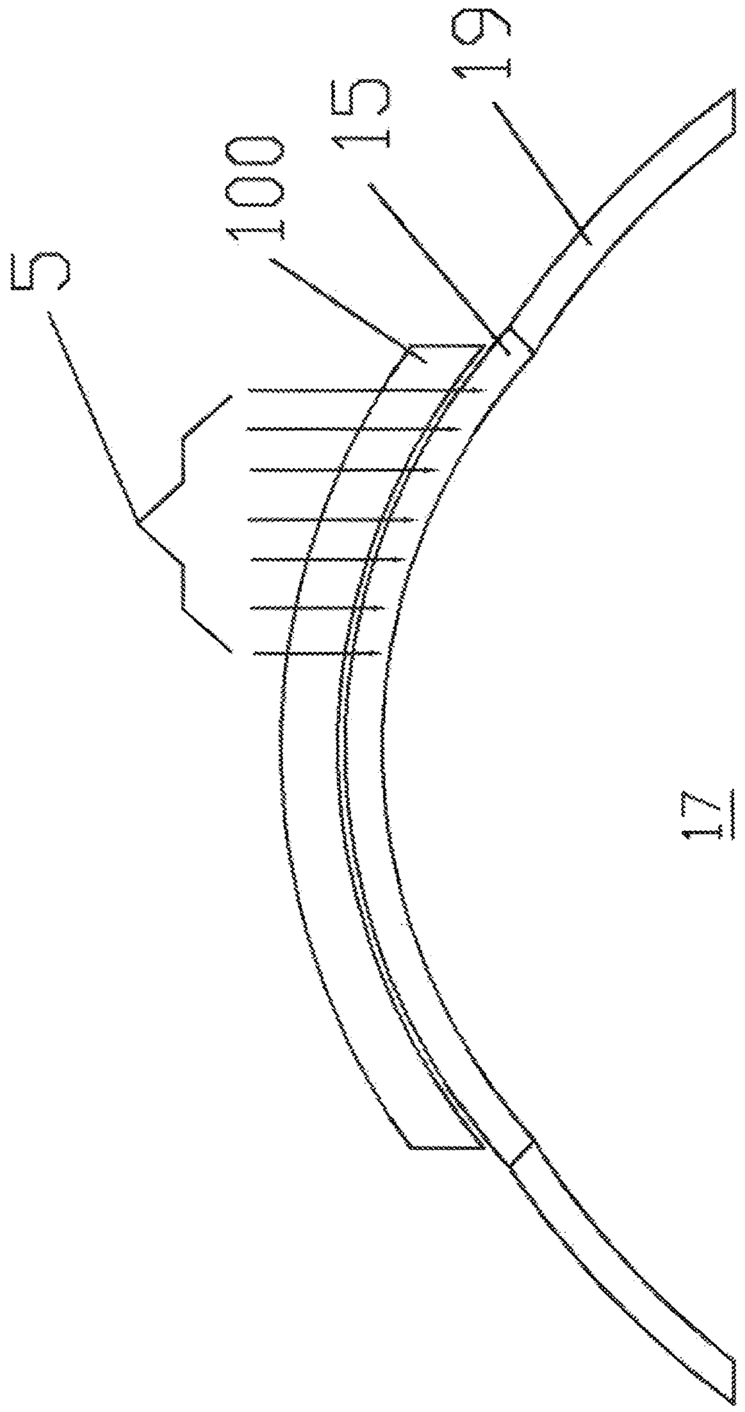
FIG. 1 illustrates how oxygen may permeate a conventional contact lens made from an oxygen permeable material.

FIG. 1 shows a conventional contact lens 100 made from an oxygen permeable material. The contact lens 100 may be positioned on top of the cornea 15 of a mammalian eye 17 (e.g., a human eye). The non-liquid crystal contact lens 100 may be made of an oxygen permeable material such that oxygen 5 may enter the non-liquid crystal contact lens 100 and permeate through contact lens 100 to reach the cornea 15 of the eye 17. FIG. 1 also illustrates the sclera 19, which is an opaque, white section of the eye 17 that surrounds the cornea 15. Oxygen 5 is required to maintain the health of the cornea 15. Thus, the oxygen permeable material of the non-liquid crystal contact lens 100 of FIG. 1 allows oxygen 5 to reach the cornea 15 to maintain a healthy cornea 15.

Figure 2A:
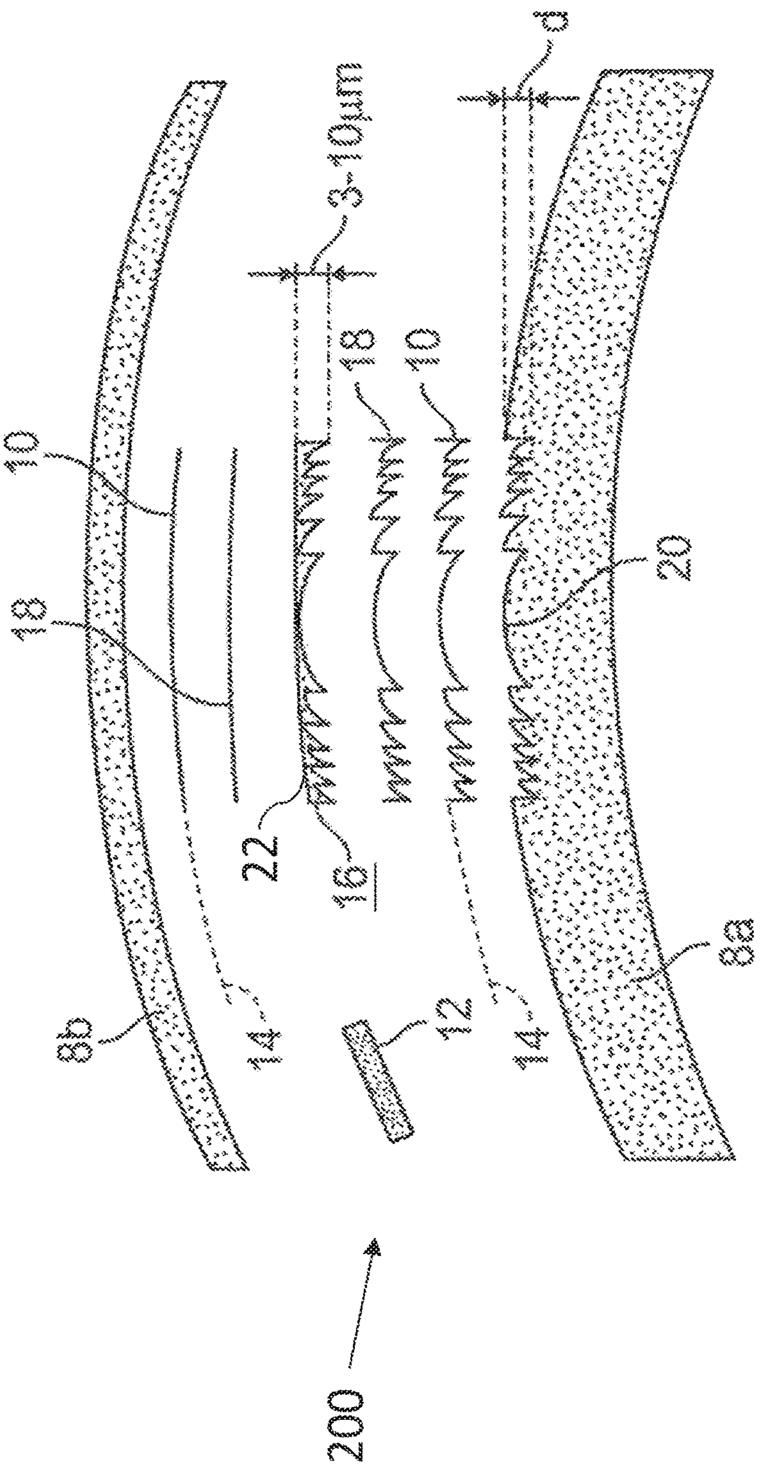
FIG. 2A shows an exploded view of a liquid crystal contact lens with a surface relief diffractive pattern and a liquid crystal layer.
Figure 2B:
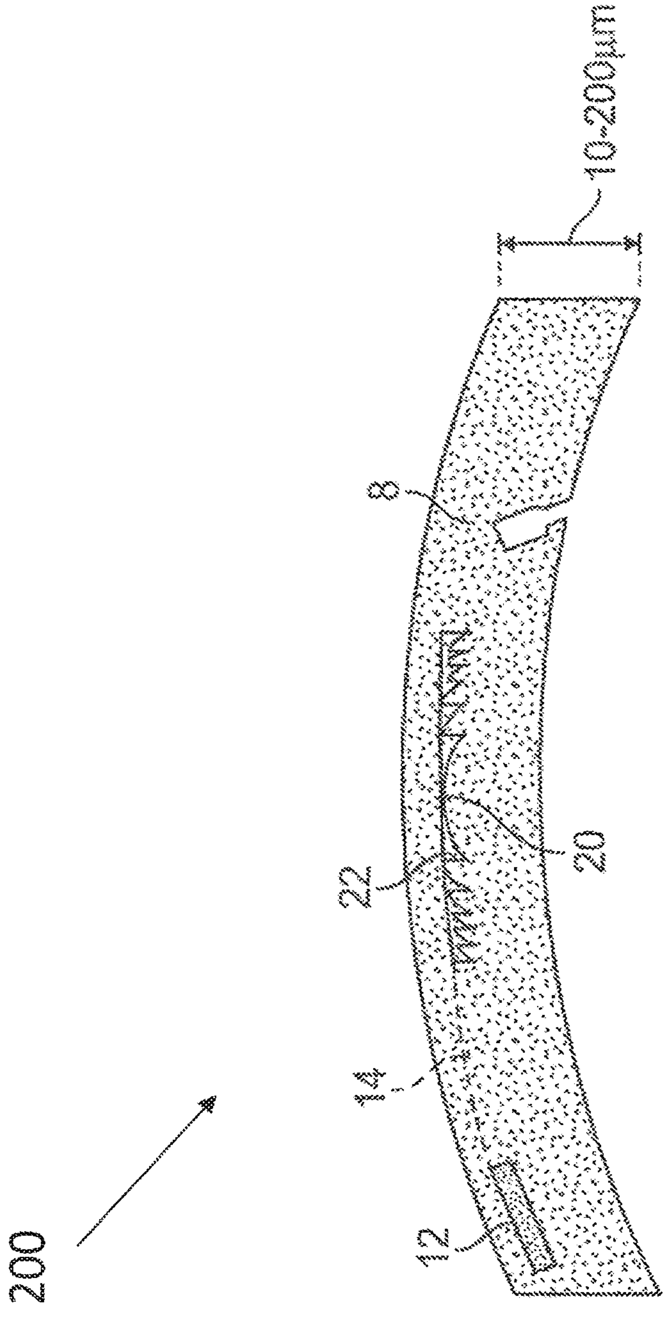
FIG. 2B shows a profile view of the liquid crystal contact lens shown in FIG. 2A.

FIGS. 2A-2E show a liquid crystal contact lens 200. FIGS. 2A and 2B show exploded and collapsed profile views, respectively, of a liquid crystal contact lens 200 with a surface relief diffractive pattern 20 and a liquid crystal layer 22. As shown in FIG. 2A, the liquid crystal contact lens may include a first substrate 8*a* with a surface relief diffractive pattern 20 (e.g., a Fresnel lens pattern) on one surface that varies within a depth, d, a second substrate 8*b*, a liquid crystal layer 22 made up of liquid crystal material 16, electrodes 10, a controller 12, electrical connections 14, and one or more alignment layer(s) 18. The liquid crystal layer 22 may be disposed between the first and second substrates 8*a* and 8*b*, which together form a flexible housing 8 as shown in FIG. 2B that encapsulates the liquid crystal layer 22. The liquid crystal layer 22 may be tailored to allow oxygen to pass through the liquid crystal layer 22. For example, the liquid crystal material 16 may be in the form of a liquid that is oxygen permeable.

The first and second substrates 8*a* and 8*b* may both be transparent. The first and second substrates 8*a* and 8*b* may also be curved to provide static optical power. One or both of the first and second substrates 8*a* and 8*b* may be patterned (e.g., in the shape of a Fresnel lens) or have one or more refractive and/or diffractive structures to provide static optical power. For example, as shown in FIG. 2A, the first substrate 8*a* may have a surface relief diffractive pattern 20 (e.g., a Fresnel lens pattern) on one surface that varies within a depth, d. The depth, d, of the surface relief diffractive pattern 20 may be about 2 μm thick to about 25 μm thick, including all values in between. The first and second substrates 8*a* and 8*b* may be composed, of, by way of example only, polysulphones, polyetherimides, polyamides, and/or other flexible materials.

The electrodes 10 are in electrical communication with the liquid crystal layer 22. In operation, the electrodes 10 applies an electric field to the liquid crystal layer 22 that modulates the liquid crystal material's refractive index, changing the liquid crystal lens's optical power (i.e., the degree to which the liquid crystal contact lens focuses incident light). The controller 12 may be adapted for electrically driving the electrodes 10 (e.g., via buss lines and/or resistive bridges, not shown) for modulating the electric field applied to the liquid crystal layer 22 and the optical power of the liquid crystal lens 200.

The alignment layers 18 orient the liquid crystal molecules in the liquid crystal layer 22 for providing an initial refractive index of the liquid crystal layer 22 when the applied electric field is below a first predetermined threshold. Applying an electric field with a larger amplitude (e.g., an amplitude above a second predetermined threshold) across the liquid crystal layer 22 with the electrodes 10 realigns the liquid crystal molecules, altering the refractive index of the liquid crystal layer 22.

The refractive index of the first and second substrates 8*a* and 8*b* may be fixed. In one example, the refractive index of the liquid crystal layer 22 may alternate between matching and mismatching the fixed refractive index of the first and second substrates 8*a* and 8*b*.

For failsafe operation, when no voltage is applied across the electrodes 10, the liquid crystal layer 22 may have (by way of example only) a refractive index, n, (e.g., 1.67) approximately equal to the refractive index of the first substrate 8*a*. In this embodiment, the material of the first substrate 8*a* also has a refractive index approximately equal to 1.67. When the refractive index of the liquid crystal layer 22 matches the refractive index of the first substrate 8*a*, the liquid crystal contact lens 200 may have a negligible (e.g., zero) optical power. When the refractive index of the liquid crystal layer 22 does not match the refractive index of the first substrate 8*a*, the liquid crystal contact lens may have an optical power provided at least in part by the surface relief diffractive pattern 20. The liquid crystal layer 22 may have a thickness, e.g., less than 25 μm. For example, the liquid crystal layer 22 may be about 2 μm thick to about 25 μm thick, including all values in between. The liquid crystal layer 22 may be approximately equal to the thickness of the surface relief diffractive pattern 20.

The electrodes 10 may be made of indium tin oxide (ITO), silver nanowires, carbon nanotubes, a polymer (e.g., PEDOT, PEDOT: PSS), graphene, tin oxide ($SnO_2$), gallium oxide ($Ga_2O_3$), or another suitable material that is deposited and patterned on the surfaces of the substrates 8*a* and 8*b*. ITO is an electrically conductive, transparent material that may be used to apply an electric field to the liquid crystal layer 22 to alter its refractive index, resulting in a change in optical power of the contact lens 200. For example, a layer of ITO or another suitable electrode material may be deposited or coated on the surfaces of the substrates 8*a* and 8*b*, then patterned to form the electrodes 10. The ITO layer on one substrate (e.g., substrate 8*a*) may be patterned into many individually addressable electrodes in the shape or concentric rings, parallel lines, or grid-like pixels, while the ITO layer on the other substrate (e.g., substrate 8*b*) may be (largely) unpatterned to serve as a ground plane electrode. The ITO layers may also be patterned into and/or connected to buss lines and/or resistive bridges (not shown) that connect to a voltage source.

The electrodes 10 can be electrically isolated from each other with an insulating material (not shown in FIGS. 2A-2D). The insulating material may include, but is not limited to, $SiO_2$, epoxy (e.g., SU-8), Zinc Oxide (ZnO), or another suitable material. For example, the insulating material (e.g., $SiO_2$) can be deposited on or between ITO features (e.g., electrodes 10 and buss lines) to provide electrical insulation in contact lenses. Prior to coating the surfaces of the substrates 8*a* and 8*b* with the electrode material, the insulating material (e.g., $SiO_2$) may first be deposited and optionally patterned on the surfaces of the substrates 8*a* and 8*b*. Together, the insulating material and the electrodes form an oxygen-impermeable coating 40 (FIGS. 2C and 2D) on the surfaces of the substrates 8*a* and 8*b* that form the cavity that holds the liquid crystal layer 22. This coating 40 is oxygen-impermeable because the coating materials (e.g., ITO and/or $SiO_2$), when applied in conventional processes, may be oxygen barriers that prevent oxygen from permeating through the liquid crystal contact lens 200 to reach the cornea even if the substrates 8*a* and 8*b* and liquid crystal layer 22 are oxygen permeable.

For more on contact lens construction, see, e.g., U.S. Pat. No. 9,155,614, which is incorporated herein by reference in its entirety for all purposes.

Figure 2C:
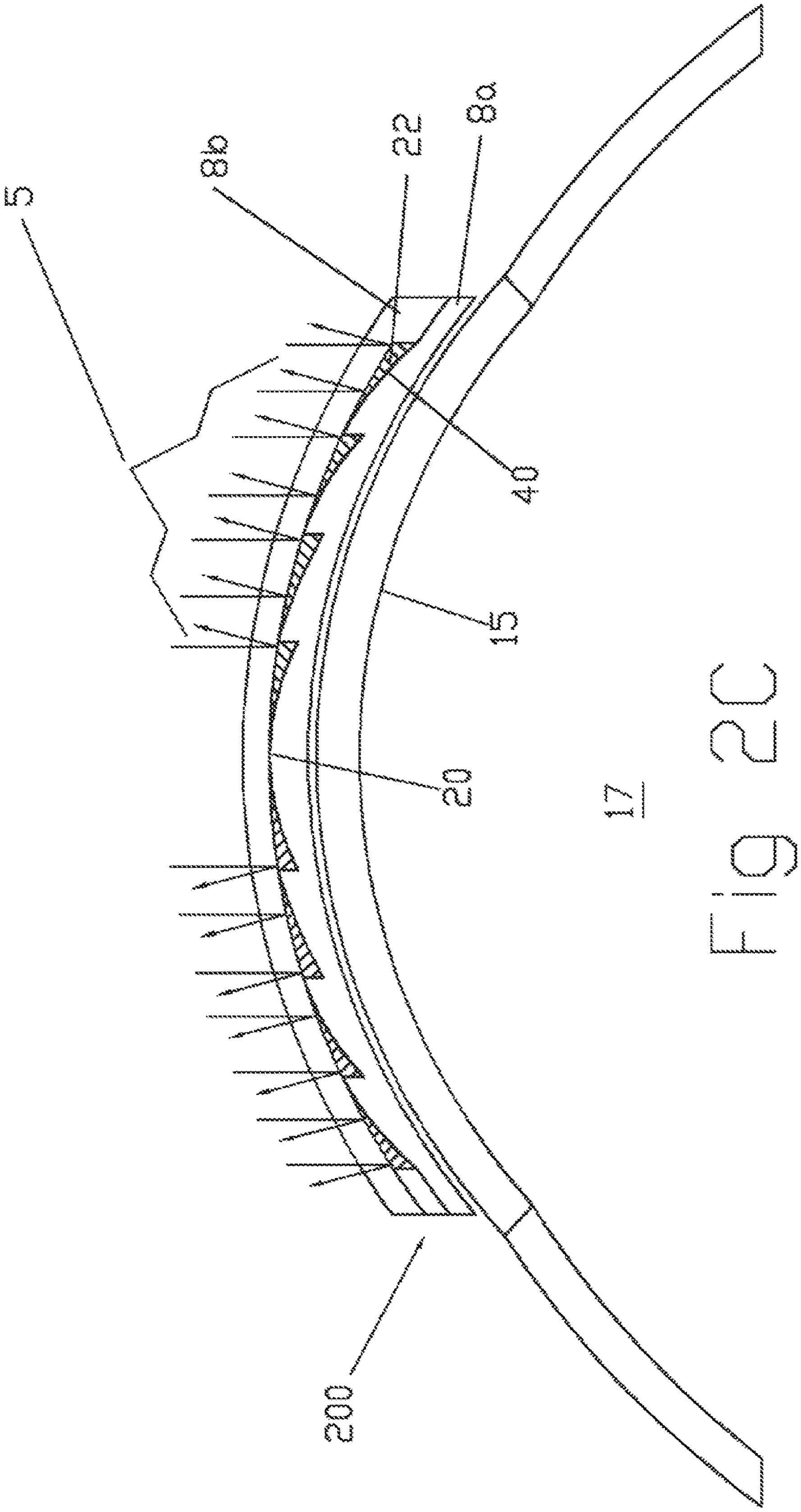
FIG. 2C shows how oxygen is not able to permeate through the liquid crystal contact lens of FIG. 2A.
Figure 2D:
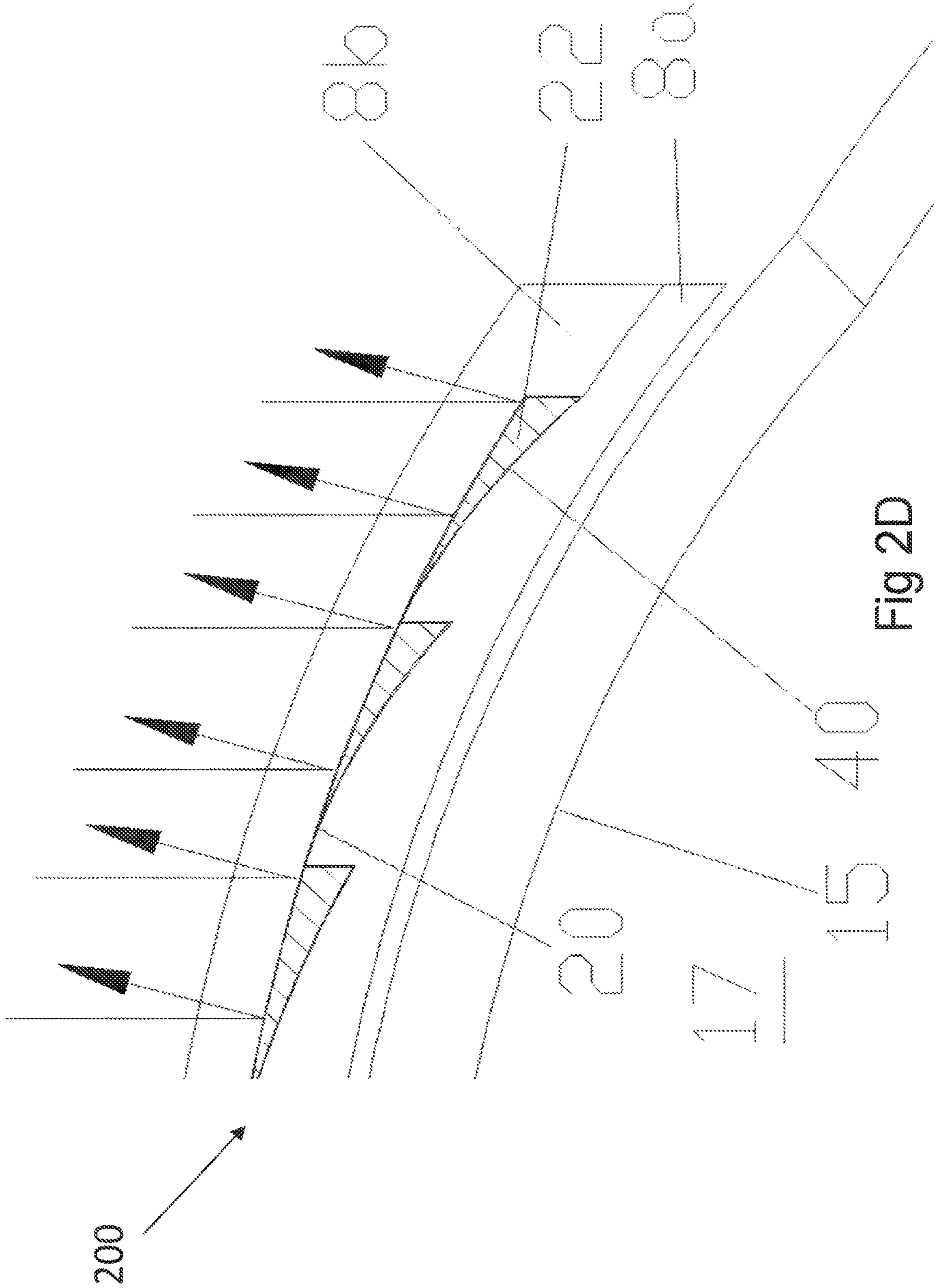
FIG. 2D shows a zoomed in portion of the liquid crystal contact lens of FIG. 2C.

FIGS. 2C and 2D show how the oxygen-impermeable coating 40 prevents the flow of oxygen through the liquid crystal contact lens 200. FIG. 2C shows the liquid crystal contact lens 200 positioned over the cornea 15 of the mammalian (e.g., human) eye 17. The sclera 19 is also shown. With the liquid crystal contact lens 200 positioned this way, the oxygen-impermeable coating 40 is directly over the cornea 15 and prevents oxygen from propagating from the atmosphere to the cornea 15 as indicated by the arrows in FIGS. 2C and 2D.

As shown in FIGS. 2C and 2D, oxygen 5 may enter the liquid crystal contact lens 200 through the second substrate 8*b* and then permeate through liquid crystal layer 22, which is disposed between the first substrate 8*a* and the second substrate 8*b*. However, when oxygen 5 reaches the coating 40, the oxygen 5 cannot permeate through the coating 40 since the coating is made of one or more oxygen non-permeable material(s) as described above. Thus, the oxygen 5 is turned away and is unable to reach the cornea 15, unlike in the traditional non-liquid crystal contact lens 100 shown in FIG. 1. As a result, the health of the cornea 15 and eye 17 may be impacted.

Figure 2E:
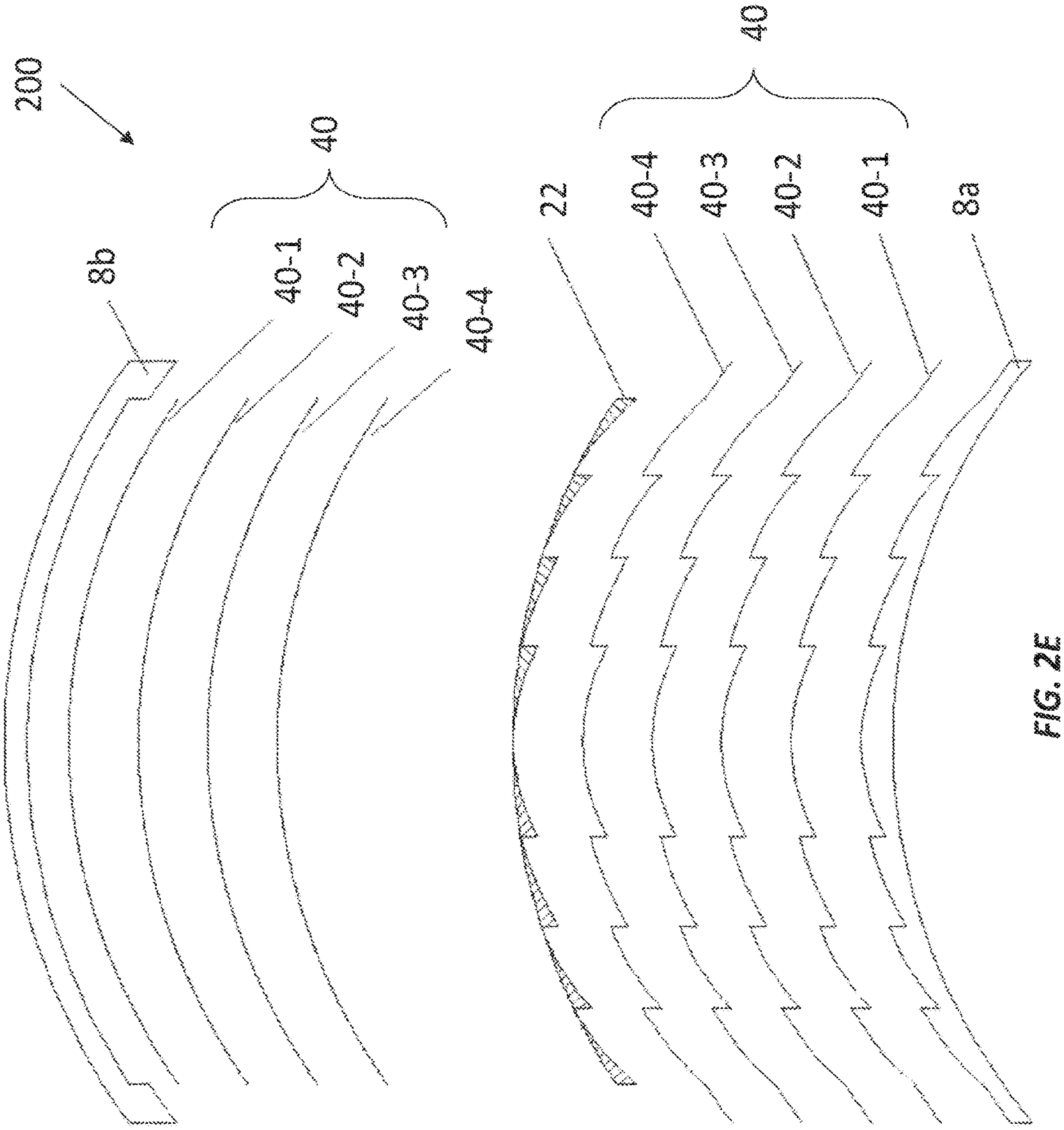
FIG. 2E shows another exploded view of a liquid crystal contact lens of FIG. 2C.

FIG. 2E shows another exploded view of the liquid crystal contact lens 200 illustrating example layers of the coating 40. As described above, the first substrate 8*a* may have a diffractive pattern on the surface of the first substate 8*a* that is opposite of the eye 17. The first substrate 8*a* and the second substrate 8*b* may also be coated with the coating 40. As shown in FIG. 2E, the second substrate 8*b* opposes the first substrate 8*a* and may also be coated with the coating 40 (or another suitable coating, for example, a coating without an alignment layer (e.g., alignment layer 40-4) and/or a coating without an insulating layer (e.g., insulating layer 40-3)). The coating 40 may include one or more layers. For example, as shown in FIG. 2E the coating 40 may include an adhesion promoter layer 40-1 that may be applied to a surface of the first substrate 8*a* and/or the second substrate 8*b*. The adhesion promoter layer 40-1 may promote the adhesion of an electrically conductive layer 40-2. An optional insulating layer 40-3 may be applied on top of the electrically conductive layer 40-2. An optional alignment layer 40-4 may also be applied to the insulating layer 40-3. The liquid crystal layer 22 may reside on the alignment layer 40-4, the insulating layer 40-3 if no alignment layer 40-4 is present, and/or the conductive layer 40-2 if no alignment layer 40-4 or insulating layer 40-3 are present.

FIG. 2E illustrates the example layers of an example coating 40. However, coating 40 may have more or fewer layers than shown in FIG. 2E. The first substrate 8*a* and the second substrate 8*b* may also be coated with the same coating (e.g., as shown in FIG. 2E) or different coatings. For example, if the coating on the first substrate 8*a* includes the insulating layer 40-3, the second substrate 8*b* may be coated with a different coating that does not include insulating layer 40-3 or vice versa. Multiple insulating layers 40-3 may add robustness to the insulation properties. As another example, if the coating on the first substrate 8*a* includes the alignment layer 40-4, the second substrate 8*b* may be coated with a different coating that does not include alignment layer 40-4 or vice versa, for example if the liquid crystal layer 22 does not require more than one alignment layer 40-4. Additionally, instead of the adhesion promoter layer 40-1, the electrically conductive layer 40-2 may also be applied directly to the first and/or second substrates 8*a* and 8*b*, for example.

Coatings that Pass Oxygen for Liquid Crystal Contact Lenses

Figure 3A:
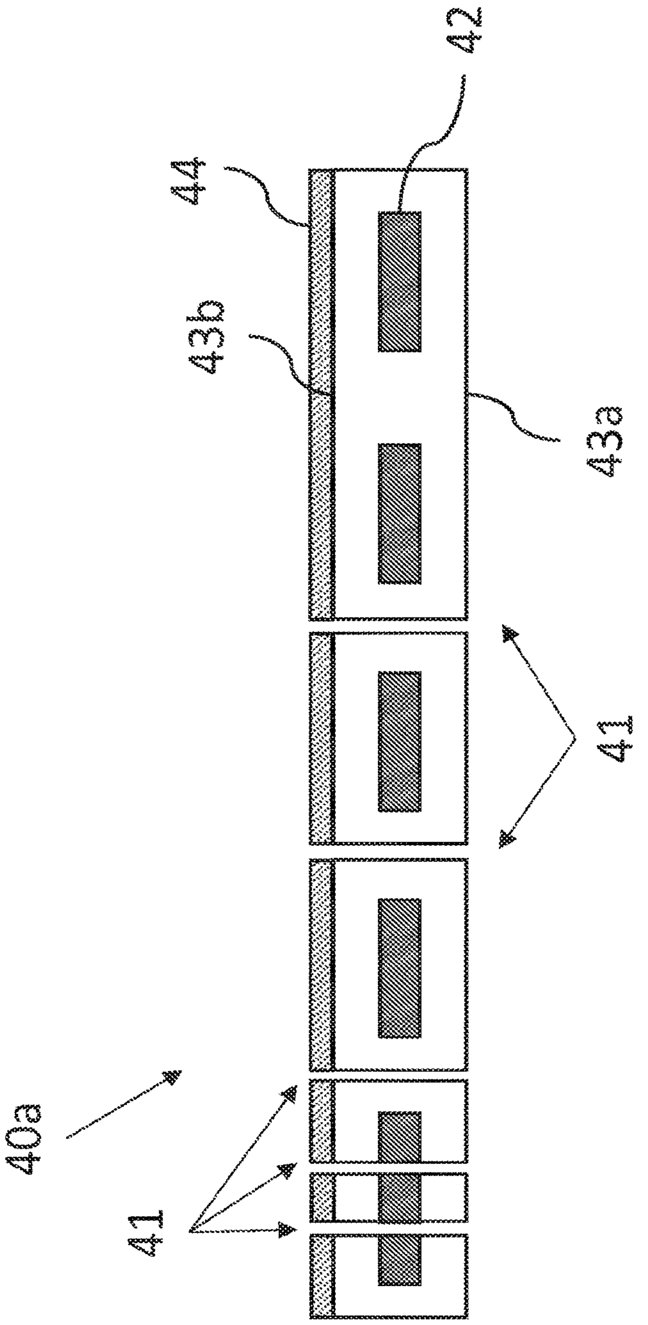
FIG. 3A shows an exploded view of an oxygen-permeable coating suitable for use on the surfaces of the cavity that holds the liquid crystal material in a liquid crystal contact lens.
Figure 3B:
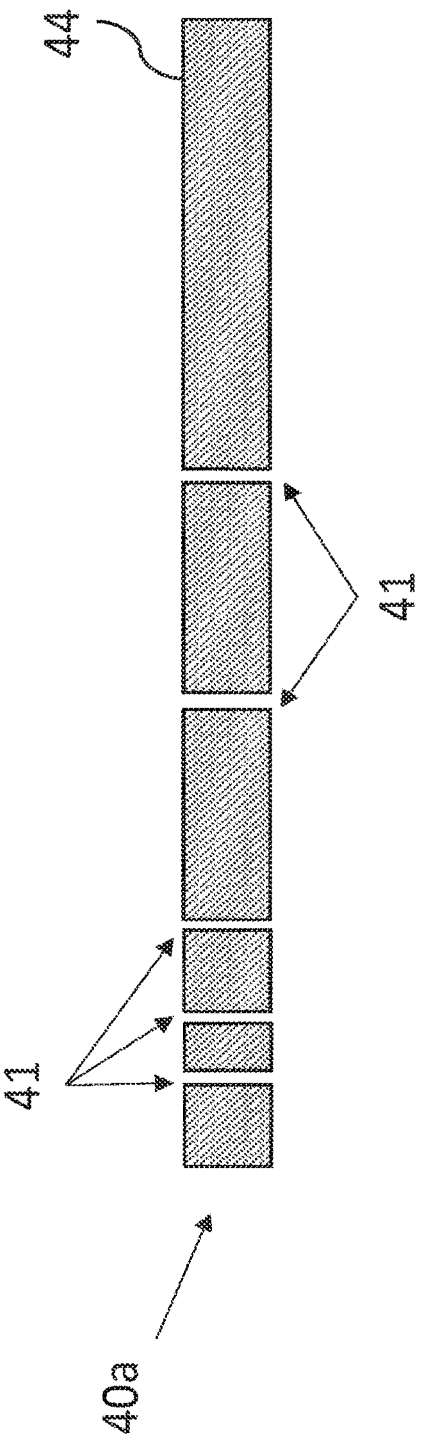
FIG. 3B shows a top view of the oxygen-permeable coating of FIG. 3A.

FIG. 3A illustrates an exploded view of an example oxygen-permeable, porous coating 40*a* for use in a liquid crystal contact lens (e.g., liquid crystal contact lens 200). FIG. 3B illustrates a top view of the porous coating 40*a*. As described above, porous coating 40*a* may be applied to the first substrate 8*a* and/or the second substrate 8*b*. In one embodiment, the first substrate 8*a* and the second substrate 8*b* are both coated with porous coating 40*a*. In another embodiment, first substrate 8*a* and the second substrate 8*b* are coated with different porous coatings (e.g., the first substrate 8*a* is coated with coating 40*a* and the second substrate 8*b* is coated with a second porous coating, for example). This porous coating 40*a* may include one or more layers of conductive and/or insulating materials for actuating the liquid crystal material in the liquid crystal contact lens with an electric field. As shown in FIG. 3A, the porous coating 40*a* may include a first insulating layer 43*a* (e.g., a first layer of $SiO_2$), a conductive layer 42 (e.g., a layer of ITO), which may be patterned into electrodes as described above, a second insulating layer 43*b* (e.g., a second layer of $SiO_2$), and an alignment layer 44 patterned with pores or holes 41 that extend all the way through the coating 40*a*. Preferably the holes 41 extend through the layers of the coating that are oxygen impermeable, including but not limited to, the first insulating layer 41*a*, the conductive layer 42, the second insulating layer 43*b*, and the alignment layer 44. As described above with respect to FIG. 2E, the alignment layer 44 may face the liquid crystal layer (e.g. liquid crystal layer 22) while the first insulating layer 43*a* may face the substrate (e.g., the first substrate 8*a* and/or the second substate 8*b*).

These holes 41 pass oxygen through the otherwise oxygen-impermeable layers of the porous coating 40*a* as shown in FIG. 3B. They can have any of a variety of cross-sectional shapes, includes circles, ovals, squares, rectangles, hexagons, and freeform shapes, and can range in diameter or maximum lateral dimension from about 1 μm to about 100 μm, including all values in between (e.g., about 1 μm, about 5 μm, about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm or 100 μm). They can all have the same shape and/or size or they can have different shapes and/or sizes. The holes 41 can be arranged in a periodic array (e.g., a square or hexagonal array) with a pitch between holes in a ratio of no holes: holes of about 20:1 to about 0.5:1, including all values in between (e.g., about 20:1, about 15:1, about 10:1, about 9:1, about 8:1, about 7:1, about 6:1, about 5:1, about 4:1, about 3:1, about 2:1 about 1:1, or about 0.5:1), a sparse array, or an aperiodic array. The holes 41 can be arranged as concentric gaps in a diffractive pattern with a gap of about 1 degree to about 359.98 degrees, including all values in between (e.g., about 1 degree, about 5 degrees, about 10 degrees, about 15 degrees, about 20 degrees, about 30 degrees, about 40 degrees, about 50 degrees, about 60 degrees, about 70 degrees, about 80 degrees, about 90 degrees, about 100 degrees, about 150 degrees, about 200 degrees, about 250 degrees, about 300, about 350 degrees, or about 359.98 degrees). The holes 41 can extend all the way through the first insulating layer 43*a*, conductive layer 42, second insulating layer 43*b*, and the alignment layer 44, exposing the surface of the oxygen-permeable substrate to direct contact with the liquid crystal material. The holes 41 can also be located in regions of the coating without conductive material, e.g., in gaps between electrodes filled with insulating material (i.e., where the first and second insulating layers meet).

Figure 4A:
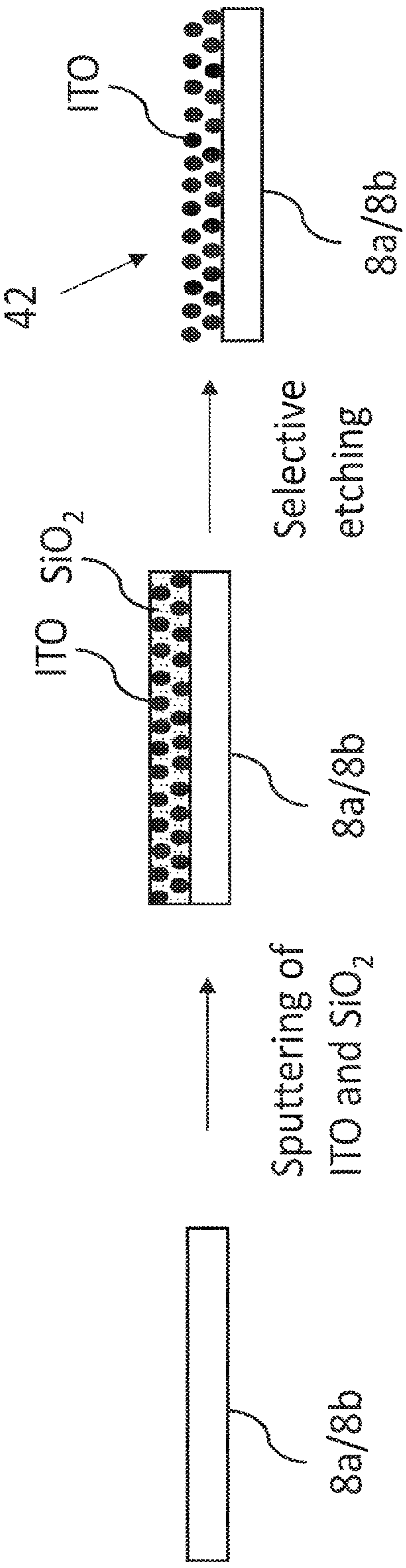
FIG. 4A shows forming a porous layer of an oxygen-permeable coating suitable for use with a liquid crystal contact lens with selective etching.
Figure 4B:
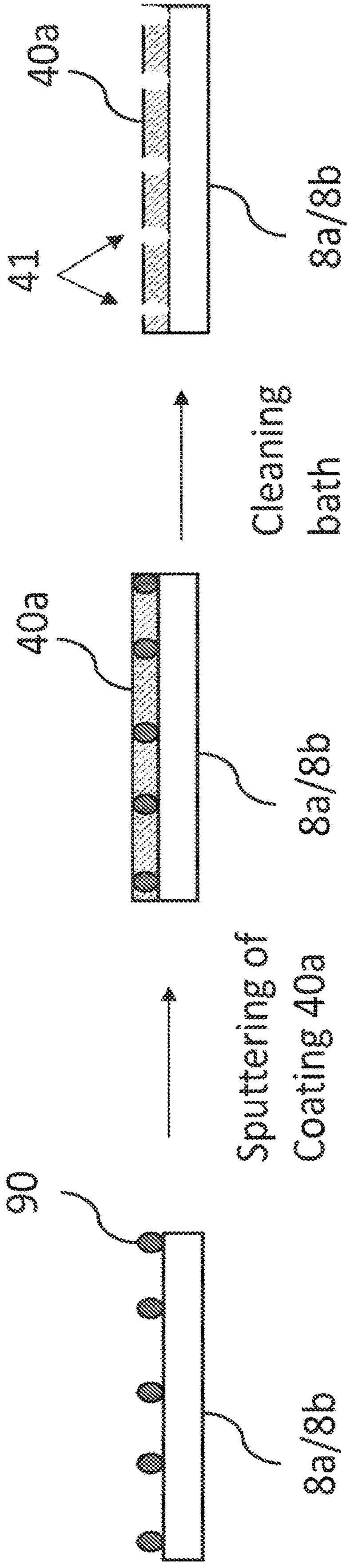
FIG. 4B shows using micro-particles to form an oxygen-permeable coating suitable for use with a liquid crystal contact lens.
Figure 4C:
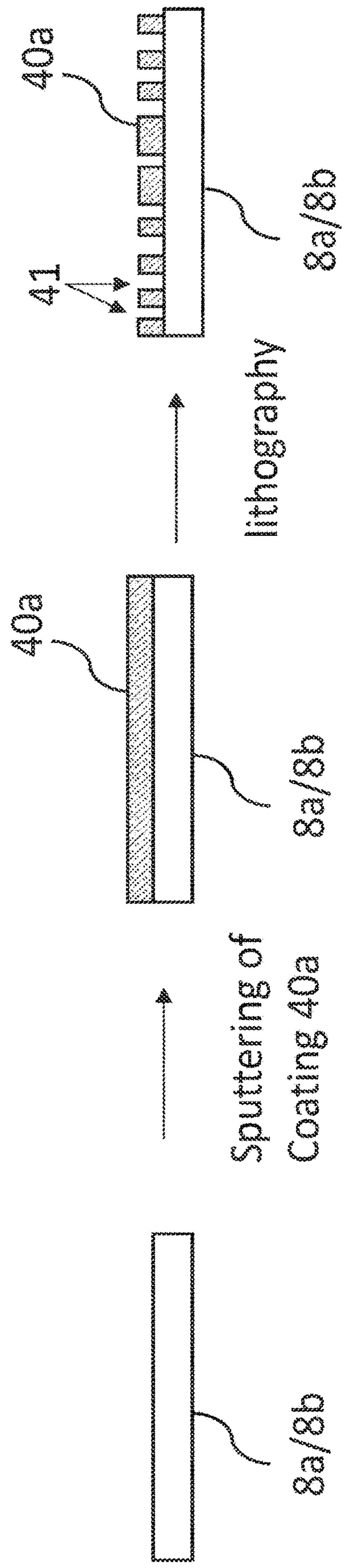
FIG. 4C shows using lithography to form an oxygen-permeable coating suitable for use with a liquid crystal contact lens.

FIGS. 4A-4C illustrate approaches that may be used alone or in combination to form the porous coating 40*a*.

1. Increasing the Porosity of One or More Layers of the Coating

The porosity of the porous coating 40*a* allows oxygen transport through the porous coating 40*a*. For example, to increase the porosity of coating 40*a*, the porosity of the first insulating layer 43*a* (e.g., a first layer of ($SiO_2$)), the conductive layer 42 (e.g., a layer of ITO), the second insulating layer 43*b* (e.g., a second layer of ($SiO_2$)), and/or the alignment layer 44 may be increased.

FIG. 4A illustrates an example method for creating a porous conductive layer 42. Making the conductive layer 42 porous allows oxygen to reach the cornea. For example, porous ITO may be made using oblique angle sputtering deposition or another suitable method. Two materials may be sputtered simultaneously and then the non-ITO material may be etched away while the ITO layer remains intact (e.g., without etching the ITO). For example, a mixture of ITO and $SiO_2$ may be sputtered (e.g., via oblique angle sputtering deposition) and an etchant (e.g., a buffered oxide etchant, hydrofluoric acid) may be used to etch away the $SiO_2$ but not the ITO. Following the selective etching of $SiO_2$, the resulting porous coating 40*a* may have one or more micro-gaps in the ITO where the $SiO_2$ was once. During etching of the selective etching of $SiO_2$, the portions of the conductive layer 42 that are to be preserved (e.g., the ITO) may also be covered with a material (e.g., a photoresist) to provide additional protection from the etchant. This material may then be removed following the etching. This method may be used whenever an insulating layer (e.g., insulating layer(s) 43*a* and/or 43*b*) are not positioned on top of the conductive layer 42, for example.

The insulating layers 43*a* and/or 43*b* can be made porous using similar methods. For example, porosity in a layer of $SiO_2$ may be increased by oblique angle sputtering deposition or another suitable method. Two materials may be sputtered simultaneously and then the non-$SiO_2$ material may be selectively etched away. For example, a mixture of ITO and $SiO_2$ can be sputtered, and an etchant (e.g., a hydrochloric etchant) may be used to etch away at least a portion of the $SiO_2$ but not the ITO. This may result in micro-gaps in the layer of ITO where the $SiO_2$ was previously.

FIG. 4B illustrates using micro-particles to form the porous coating 40*a*. Instead of, or in addition to, simultaneously sputtering two materials when forming the conductive and/or insulating layers, micro-particles 90 may be deposited on the surface of the substrate 8*a* and/or 8*b* prior to sputtering or otherwise depositing the coating materials (e.g., coating 40*a*) to increase the porosity of the coating 40*a*. For example, micro-particles 90 may be deposited on the substrate surface 8*a* and/or 8*b* prior to sputtering the coating 40*a*. Preferably, the micro-particles 90 have a diameter larger than the thickness of the coating 40*a*. After the sputtering is complete, the substrate 8*a* and/or 8*b* may be placed into an ultrasonic cleaning bath, which may dislodge the micro-particles 90, leaving pores or micro-holes 41 in the coating 40*a* (e.g., as shown in FIGS. 3A and 3B) where the micro-particles 90 once were.

FIG. 4C illustrates using lithography to form the porous coating 40*a*. Instead of, or in addition to, simultaneously sputtering two materials and/or depositing micro-particles, small holes (e.g., holes 41) may be patterned in the deposited coating 40*a* (e.g., the insulating and conductive materials) to make the coating 40*a* porous and/or increase its porosity as shown in FIGS. 3A and 3B. For example, small holes or slits may be patterned in the coating 40*a* using lithography or another suitable method. Small holes may be patterned in the coating 40*a* using a $CO_2$ laser or a laser with another suitable wavelength. If the coating 40*a* has more than one layer (e.g., coating 40*a*), this process may be repeated for each layer of the coating 40*a* or may be performed on the entire coating 40*a*. For example, small holes may be patterned in the first insulating layer 43*a* (e.g., a first layer of ($SiO_2$)), the conductive layer 42 (e.g., a layer of ITO), the second insulating layer 43*b* (e.g., a second layer of ($SiO_2$)), the alignment layer 44, and/or the coating 40*a* using lithography, a $CO_2$ laser, a laser with another suitable wavelength, or another suitable method.

2. Selectively Arranging the Layers of the Coating to Increase Oxygen Transport

Instead of, or in addition to, increasing the porosity of the coating 40*a*, the coating 40*a* and/or layers of the coating 40*a* may be selectively arranged in a pattern to increase oxygen transport as shown in FIGS. 3A and 3B, for example. For example, one or more patches of coating 40*a* may be strategically located on either or both of the substrates. The patches of the coating 40*a* may allow for electrical insulation and/or conduction, while allowing oxygen to pass through the portion(s) of the substrates that are uncoated, for example, as shown in FIGS. 3A and 3B.

If the coating 40*a* has more than one layer, these layers may also be selectively arranged in a pattern to increase oxygen transport as shown in FIGS. 3A and 3B, for example. For example, one or more patches of the insulating layers 43*a* and/or 43*b* (e.g., patches of $SiO_2$) may be strategically located on the first and/or second substrate. The one or more patches of the insulating layers 43*a* and/or 43*b* may allow for electrical insulation, while allowing oxygen to pass through the portion(s) of the substrates 8*a* and/or 8*b* that are uncoated with insulating layers 43*a* and/or 43*b*. For example, the first substrate 8*a* may be coated with a portion of insulating layer 43*a* (e.g., $SiO_2$) but opposite each portion of insulating layer 43*a* on the first substrate 8*a*, no second insulating layer 43*b* (e.g., $SiO_2$) is present on the second substrate 8*b*. As a result, the liquid crystal contact lens may have no insulating layer (e.g., $SiO_2$) in a large section of the contact lens. Similarly, the conducting layer 42 may be selectively arranged in a pattern to increase oxygen transport such that there are gaps in the conducting layer 42 to allow oxygen to permeate through the conducting layer 42.

3. Patterning Coating to Increase Oxygen Transport

Instead of, or in addition to, increasing the porosity of the coating 40*a* and/or selectively arranging the layers of the coating 40*a*, patterning coating 40*a* may increase oxygen transport of the coating 40*a*. For example, the coating 40*a* may be patterned through lithography, ablation, or another suitable method. The coating 40*a* may be locally ablated to allow for improved oxygen transport in the liquid crystal contact lenses disclosed herein. FIGS. 5A-7 show examples of ablated coatings for use in the liquid crystal contact lenses disclosed herein. Ablating the coating 40*a* can be achieved in many ways, including, but not limited to, laser etching (e.g., a UV laser, a $CO_2$ laser), electron beam etching, ultrasonic shaking, heat ablation, ion milling, reactive ion etching, water blast etching, and/or another suitable method for ablating. During patterning of the coating 40*a*, the portions of the coating 40*a* that are to be preserved may also be covered with a material (e.g., a photoresist) to provide additional protection during the patterning. This material may then be removed following the patterning. Instead of, or in addition to, using a material (e.g., a photoresist) to provide additional protection during the patterning, the patterning may be directed with control to only the portion of the coating 40*a* to be removed (e.g., patterned).

As described above and shown in FIGS. 2A-2D, the liquid crystal contact lens 200 may have a diffractive design. One or more peaks of the diffractive design may touch to improve optical performance. For example, if one or more peaks are coated with an insulating layer (e.g., insulating layer 43*a* and/or 43*b*), the peaks may touch. Instead of, or in addition to, an insulating layer, one or more spacer beads may be used to prevent the peaks from contact to prevent short circuiting, for example, when there is an electrically conductive surface (e.g., conductive layer 42) on both of the contact points of the peaks. The use of spacer beads is described in more detail below.

Locally ablating the coating 40*a* (e.g., an ITO and/or $SiO_2$ film) may prevent shorting across the coating 40*a* and also allow oxygen transport across the coating 40. In one embodiment, the coating 40*a* may be locally ablated at one or more peaks of the refractive design. Alternatively, the coating 40*a* may be locally ablated at the zones between adjoining rings. Alternatively, the coating 40*a* may be locally ablated at another portion of the refractive design.

Alternatively, the $SiO_2$ layer (e.g., insulating layer 43*a* and/or 43*b*) may be removed altogether using ablation. For example, the $SiO_2$ layer on one substrate may be omitted or removed such that only one substrate has a coating with an insulating layer (e.g., a layer of $SiO_2$). Alternatively, the $SiO_2$ layer (e.g., insulating layer 43*a* and/or 43*b*) may be omitted or removed on both substrates and instead one or more spacer beads may be used to prevent shorting across the coating 40*a*.

Instead of, or in addition to ablating at least a portion of the coating 40*a*, the coating 40*a* may be prevented from being deposited in at least a portion of the diffractive design to allow for improved oxygen transport in the liquid crystal contact lenses disclosed herein. Some examples of accomplishing this may include, but are not limited to, lithography, masking, lift-off etching, and/or another suitable method for selectively applying the coating 40*a* (e.g., one or more layers of $SiO_2$ and/or ITO). For example, if silver nanowires are used for the conductive layer of the coating, the silver nanowires may be applied with a transfer print technique and holes in the coating 40*a* may be patterned using lithography or another suitable erosion method (e.g., laser ablation or water blast).

Figure 5A:
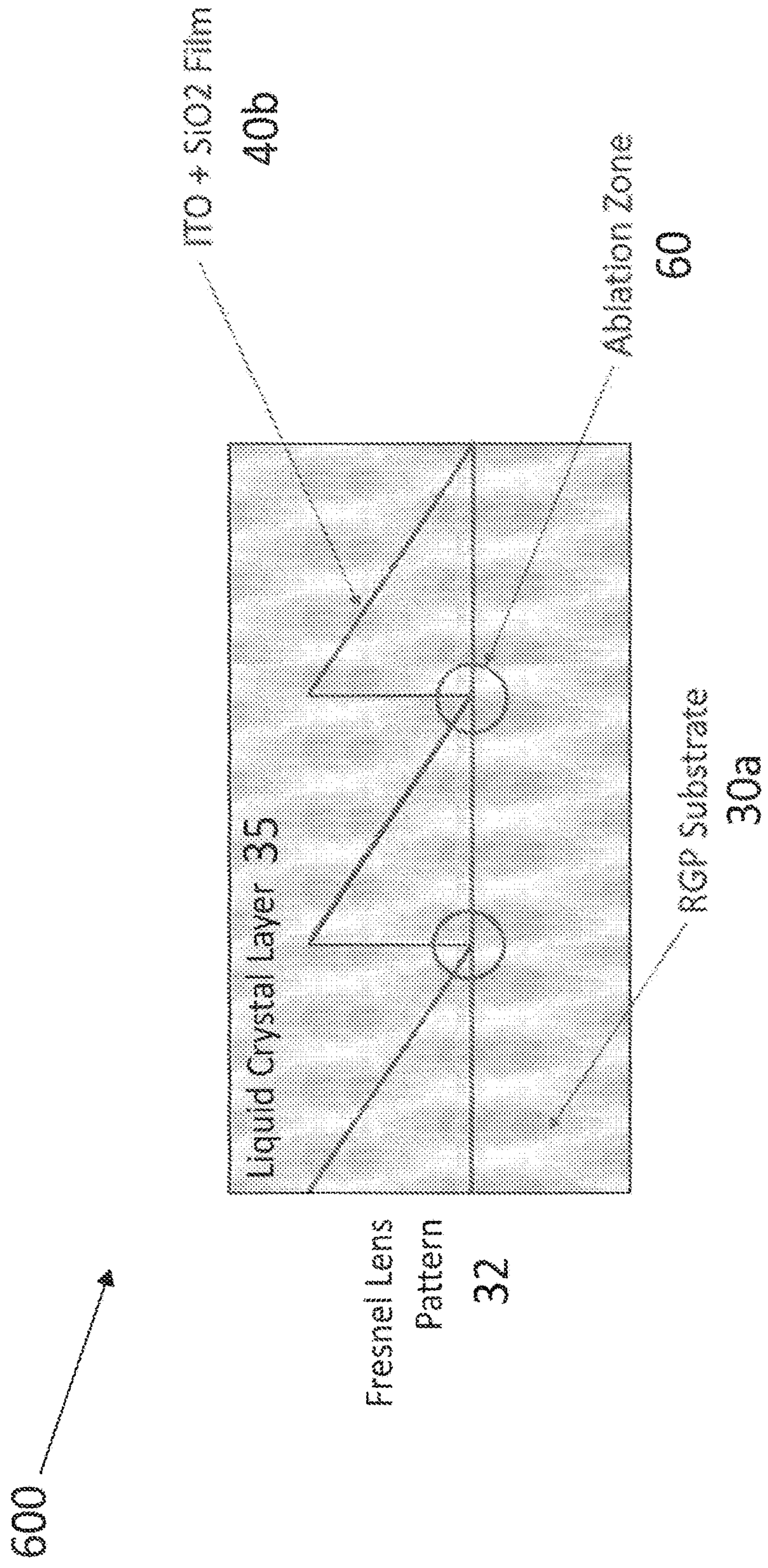
FIG. 5A shows a close-up of a liquid crystal lens with an oxygen-permeable rigid gas permeable (RGP) substrate patterned with a Fresnel lens pattern and an oxygen-permeable, porous coating made of oxygen-impermeable $SiO_2$ and ITO.
Figure 5B:
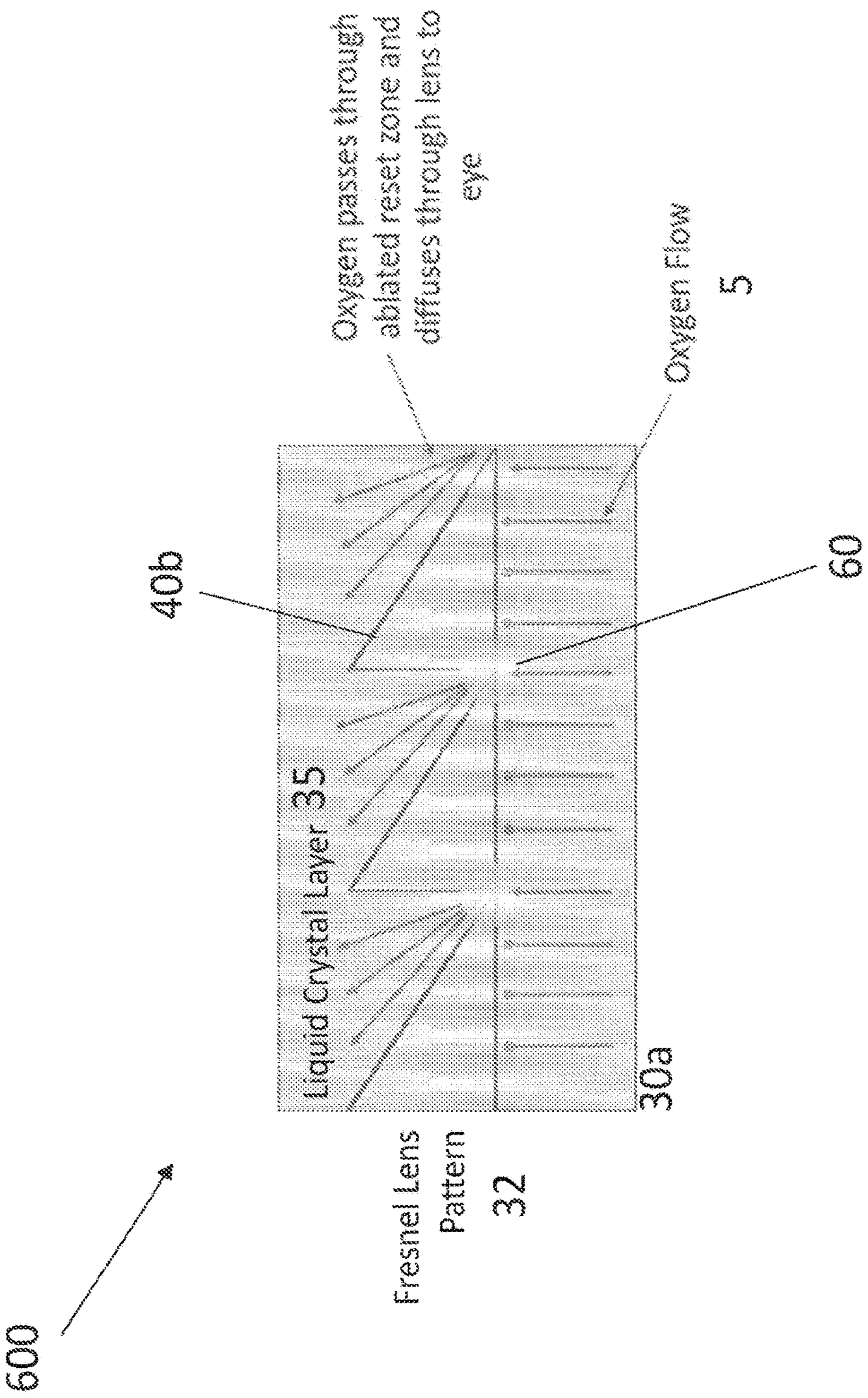
FIG. 5B shows how ablation zones in the coating of FIG. 5A allows oxygen to pass through the coating.

FIGS. 5A and 5B illustrate a portion of a liquid crystal lens 500 with a liquid crystal layer 35 made up of liquid crystal material and a partially ablated coating 40*b* with an ablation zone 60 where the coating 40*b* has been ablated to increase oxygen transport through the coating 40*b*. FIG. 5A shows a close-up of the liquid crystal lens 500, which includes a first substrate 30*a* (e.g., an oxygen-permeable RGP substrate) patterned with a Fresnel lens pattern 32. The rings of the Fresnel lens pattern 32 are coated with coating 40*b*, which are used to actuate the refractive index of a liquid crystal layer 35 on the Fresnel lens pattern 32. The coating 40*b* is ablated away from the boundaries or zones between adjoining rings (also called phase reset zones or simply reset zones) in the Fresnel lens pattern 32, allowing oxygen to pass through the coating 40*b* as shown in FIG. 5B. As described above, the liquid crystal layer 35 may be disposed between the first substrate 30*a* and the second substate (not shown). The coating 40*b* may be electrically connected to an electrical source (not shown) to ensure proper operation of the liquid crystal contact lens 500.

As described above, the liquid crystal contact lens 500 may also include electrodes (not shown), a controller (not shown), electrical connections (not shown), and/or one or more alignment layers (not shown). The coating 40*b* may be in electrical communication with the liquid crystal layer 35. In operation, a conducive layer of the coating 40*b* may apply an electric field to the liquid crystal layer 35 that may modulate the liquid crystal material's refractive index, changing the liquid crystal lens's optical power (i.e., the degree to which the liquid crystal contact lens focuses incident light). A controller (not shown) may be adapted for electrically driving the coating 40*b* (e.g., via buss lines, electrodes, and/or resistive bridges, not shown) for modulating the electric field applied to the liquid crystal layer 35 and the optical power of the liquid crystal lens 500.

The ablation zone(s) 60 may range in size. For example, the diameter of the ablation zone(s) 60 may be approximately 10 nm to approximately 1 μm, including all values in between. The depth of the ablation zone(s) 60 may range from 1 nm to about 25 μm including all values in between (e.g., about 1 nm, about 10 nm, about 20 nm, about 30 nm, about 40 nm, about 50 nm, about 60 nm, about 70 nm, about 100 nm, about 200 nm, about 300 nm, about 400 nm, about 500 nm, about 600 nm, about 700 nm, about 800 nm, about 900 nm, about 1 μm, about 5 μm, about 10 μm, about 15 μm, about 20 μm, or about 25 μm). Preferably, the depth of the ablation zone(s) 60 may be approximately equal to the thickness of the coating 40*b*.

The number of ablation zone(s) 60 in the coating 40*b* may also range in number depending on the size of the ablation zone(s) 60. For example, the number of ablation zone(s) 60 may range from about 10 to about 1000, including all values in between (e.g., about 10, about 20, about 30, about 40, about 50, about 60, about 70, about 80, about 90, about 100, about 150, about 200, about 250, about 300, about 350, about 400, about 450, about 500, about 550, about 600, about 650, about 700, about 750, about 800, about 850, about 900, about 950, or about 1000).

Figure 6A:
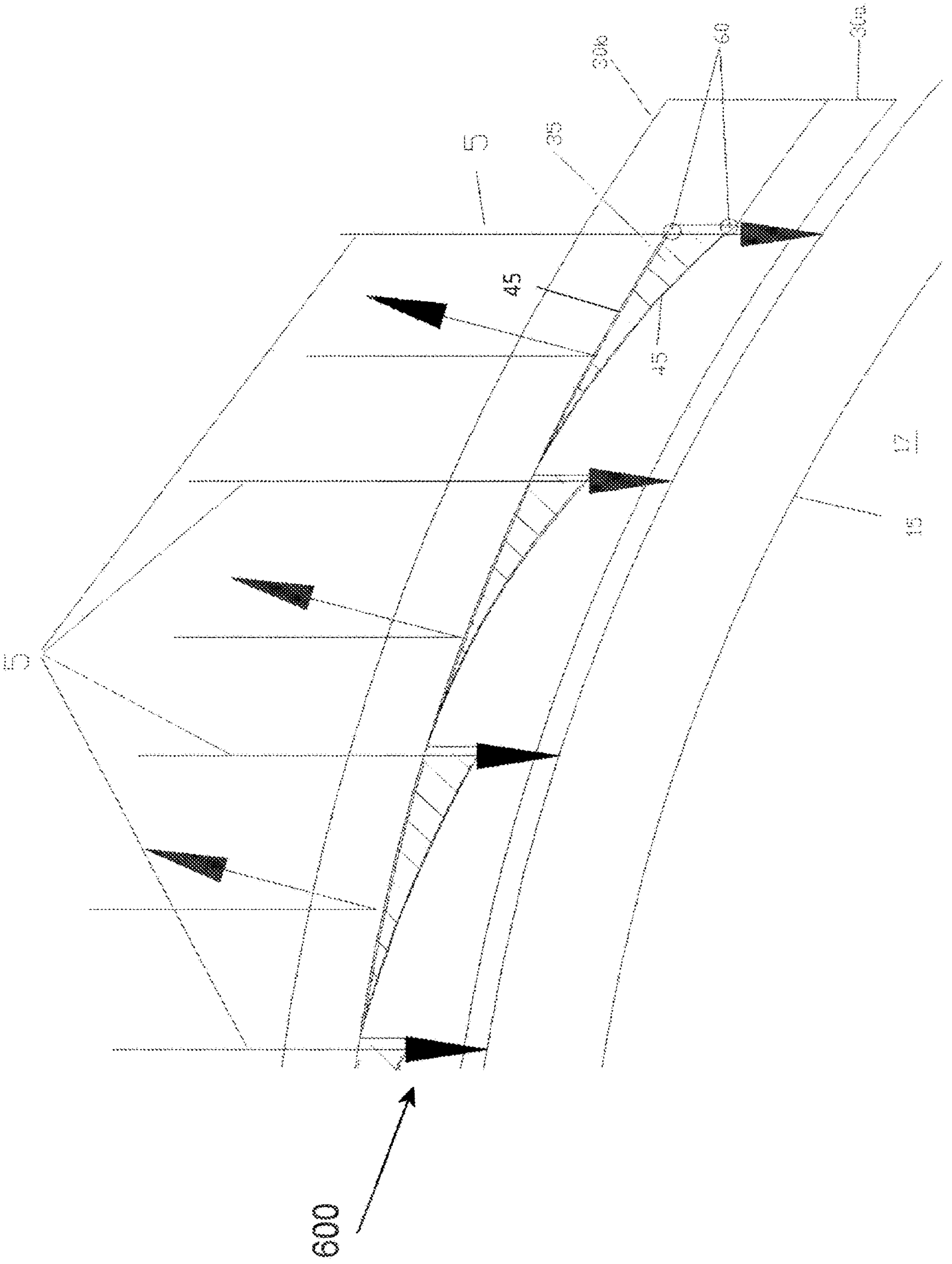
FIG. 6A shows a portion of a liquid crystal contact lens where a section of the coating has been removed on each substrate to allow oxygen to permeate through the liquid crystal contact lens.
Figure 6B:
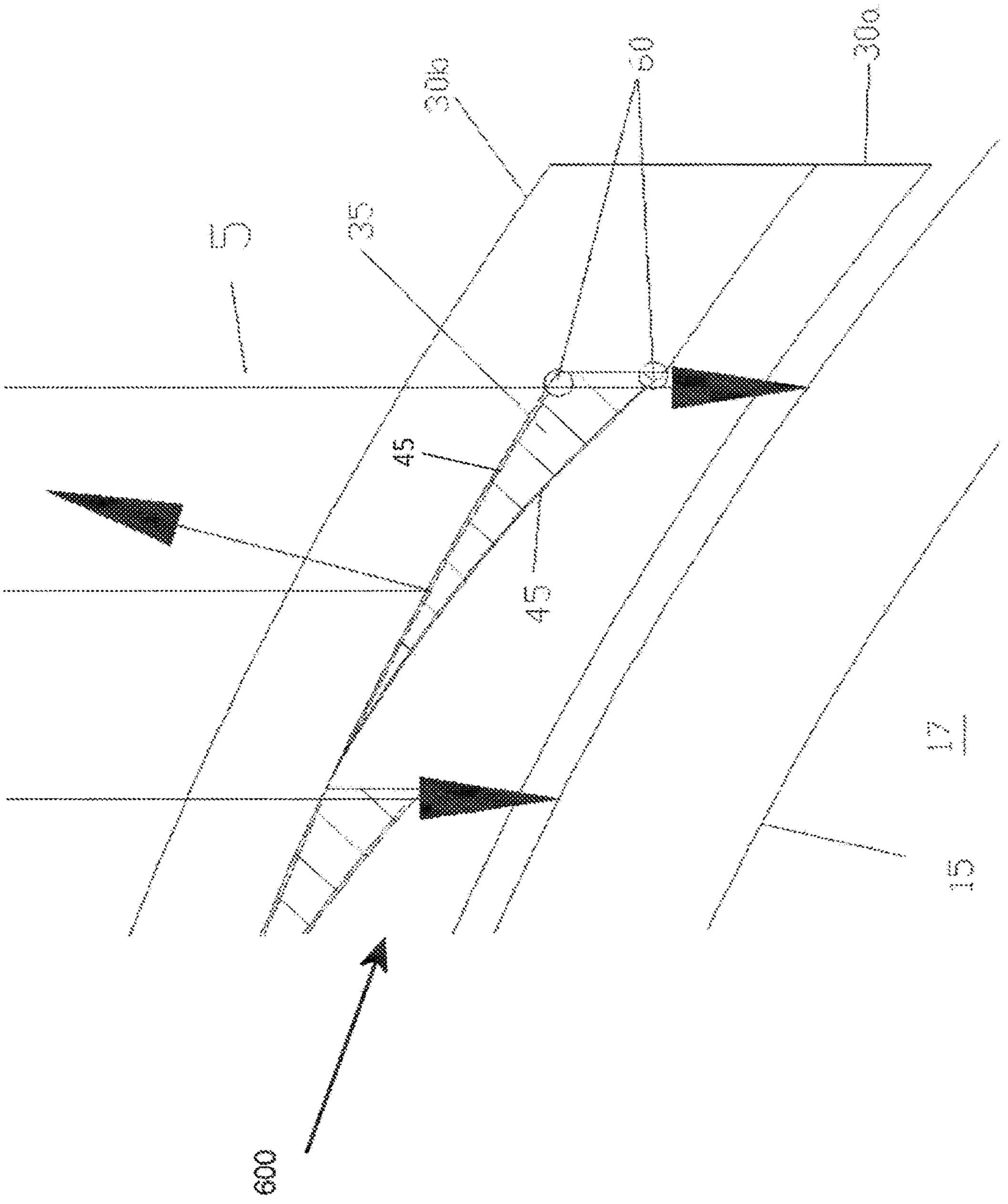
FIG. 6B shows a zoomed in portion of the liquid crystal contact lens of FIG. 6A.

FIGS. 6A and 6B show a liquid crystal contact lens 600 with at least a portion of the coating 45 removed on both the first and second substrates 30*a* and 30*b* to allow oxygen 5 to permeate through the contact lens 600 in the zone(s) 60 where the coating 45 has been removed (e.g., ablation zone 60). As described above, the liquid crystal contact lens 600 may include a liquid crystal layer 35 made up of a liquid crystal material, a first substrate 30*a*, and a second substrate 30*b*. As shown in FIG. 6A, the liquid crystal layer 35 may be disposed between the first substrate 30*a* and the second substrate 30*b*, trapping the liquid material between the two sections. One or more of the substrates (30*a* and 30*b*) may be patterned (e.g., in the shape of a Fresnel lens) or have one or more refractive and/or diffractive structures to provide static optical power. The first and/or second substrate surfaces may also be coated with additional layers, such as coating 45. As described above, coating 45 may be made of an oxygen non-permeable material. For example, the coating may be made of indium tin oxide (ITO), silicon dioxide ($SiO_2$), or a combination of ITO and $SiO_2$. The coating 45 may be electrically connected to an electrical source (not shown) to ensure proper operation of the liquid crystal contact lens 600.

As described above, the liquid crystal contact lens 600 may also include electrodes (not shown), a controller (not shown), electrical connections (not shown), and/or one or more alignment layers (not shown). The coating 45 may be in electrical communication with the liquid crystal layer 35. In operation, a conducive layer of the coating 45 may apply an electric field to the liquid crystal layer 35 that may modulate the liquid crystal material's refractive index, changing the liquid crystal lens's optical power (i.e., the degree to which the liquid crystal contact lens focuses incident light). A controller (not shown) may be adapted for electrically driving the coating 45 (e.g., via buss lines, electrodes, and/or resistive bridges, not shown) for modulating the electric field applied to the liquid crystal layer 35 and the optical power of the liquid crystal lens 600.

FIG. 6B shows a zoomed-in section of FIG. 6A, allowing a better visualization of the zones 60 of coating 45 that have been removed (e.g., ablation zone 60) from the first and second substrates 30*a* and 30*b*. In the liquid crystal contact lens 600 of FIGS. 6A and 6B, oxygen 5 may enter the liquid crystal contact lens 600 through the second substrate 30*b* and then permeate through liquid crystal layer 35, which is disposed between the first substrate 30*a* and the second substrate 30*b*. When oxygen 5 reaches the coating 45, the oxygen 5 cannot permeate through the coating 45 since the coating is made of an oxygen non-permeable material as described above. However, as shown in FIG. 2D, oxygen 5 may permeate through the ablation zone 60 where the coating 45 has been removed. Thus, in the liquid crystal contact lens 600 of FIGS. 6A and 6B, oxygen 5 may be transported to the cornea 15 through the liquid crystal contact lens 600.

Figure 7:
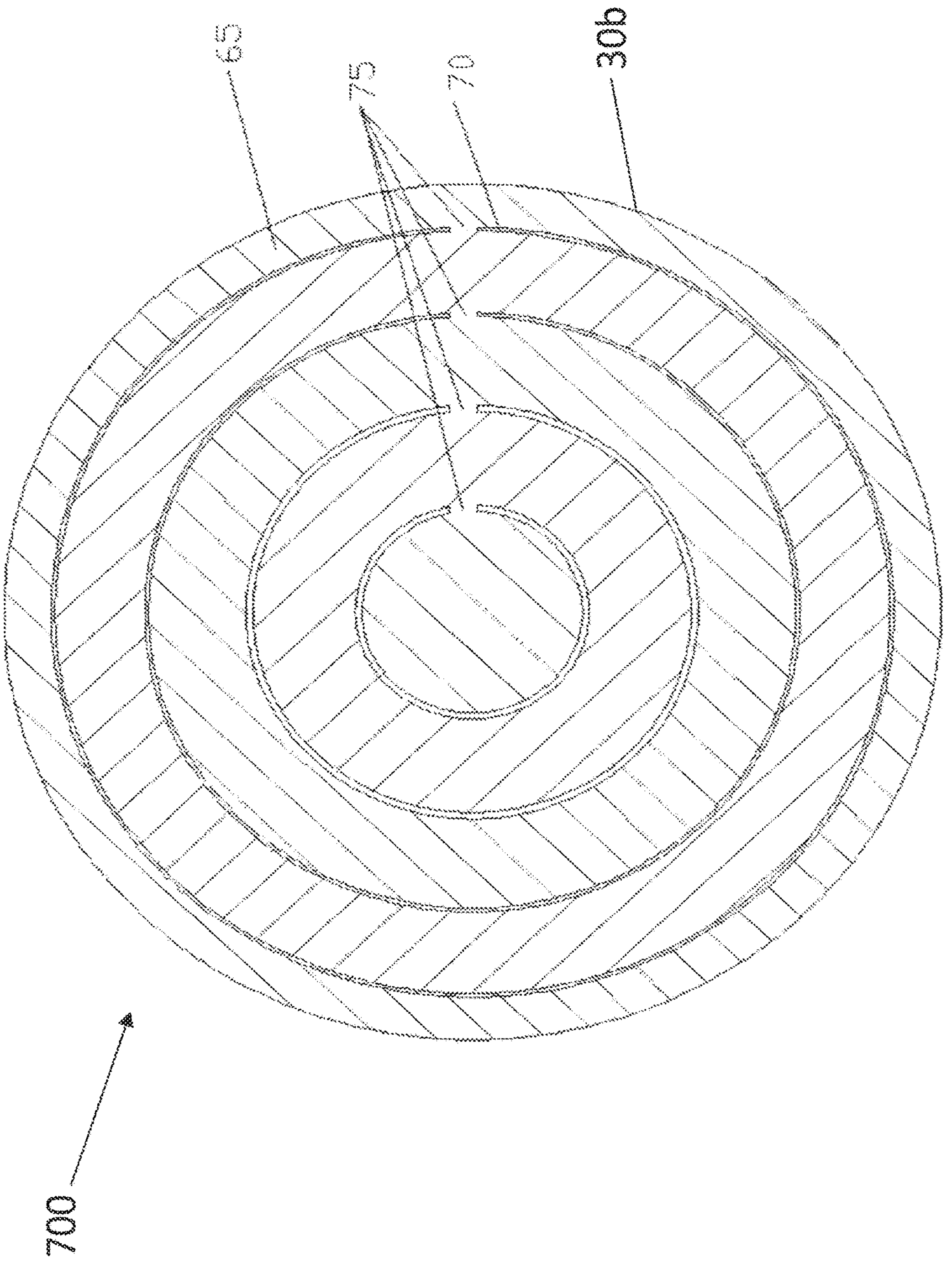
FIG. 7 shows a top view of a liquid crystal contact lens with an oxygen non-permeable coating that has been at least partially removed to allow oxygen to permeate through the liquid crystal contact lens.

FIG. 7 shows a top view of a liquid crystal contact lens 700. As described above, the liquid crystal contact lens 700 may include a liquid crystal layer (not shown), a second substrate 30*b*, and a first substrate (not shown). The liquid crystal layer may be disposed between the first substrate and the second substrate 30*b* as described above. One or more of the first and second substrates 30*a* and 30*b* may be patterned (e.g., in the shape of a Fresnel lens) or have one or more refractive and/or diffractive structures to provide static optical power. The first and/or second substrate surfaces may also be coated with additional layers (e.g., coating 65). As shown in FIG. 7, the liquid crystal contact lens 700 may include coating 65. As described above, coating 65 may be made of an oxygen non-permeable material. For example, the coating 65 may be made of indium tin oxide (ITO), silicon dioxide ($SiO_2$), or a combination of ITO and $SiO_2$. The coatings 65 may be electrically connected to an electrical source (not shown) to ensure proper operation of the liquid crystal contact lens 700.

As described above, the liquid crystal contact lens 700 may also include electrodes (not shown), a controller (not shown), electrical connections (not shown), and/or one or more alignment layers (not shown). The coating 65 may be in electrical communication with the liquid crystal layer 35. In operation, a conducive layer of the coating 65 may apply an electric field to the liquid crystal layer 35 that may modulate the liquid crystal material's refractive index, changing the liquid crystal lens's optical power (i.e., the degree to which the liquid crystal contact lens focuses incident light). A controller (not shown) may be adapted for electrically driving the coating 65 (e.g., via buss lines, electrodes, and/or resistive bridges, not shown) for modulating the electric field applied to the liquid crystal layer 35 and the optical power of the liquid crystal lens 700.

As described above, at least a portion 70 of the coating 65 may be removed to allow oxygen to permeate through the liquid crystal contact lens 700. One or more bridges 75 may allow electrical connections to be made across the portion 70 of the coating 65 that was removed so that all areas with a coating 65 may be connected. The bridges 75 may be made of the same material as the electrically conductive layer of the coating 65 (e.g., indium tin oxide (ITO)). The bridges 75 may include portion of the coating 65 that was not ablated away.

4. Using Spacer Beads

Figure 8A:
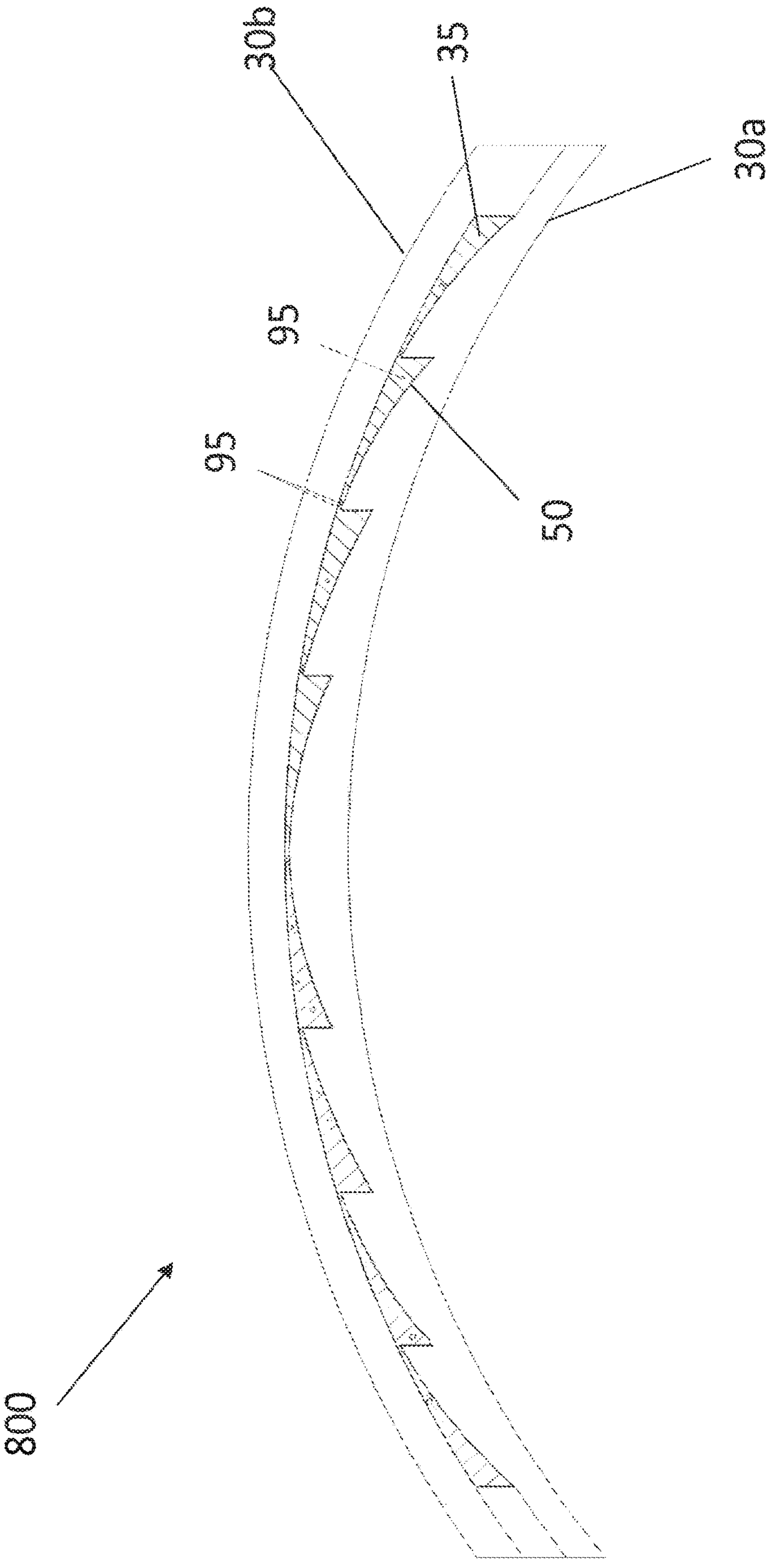
FIG. 8A shows a liquid crystal contact lens with porous coatings made of oxygen-impermeable conductive material and kept apart by spacer beads.
Figure 8B:
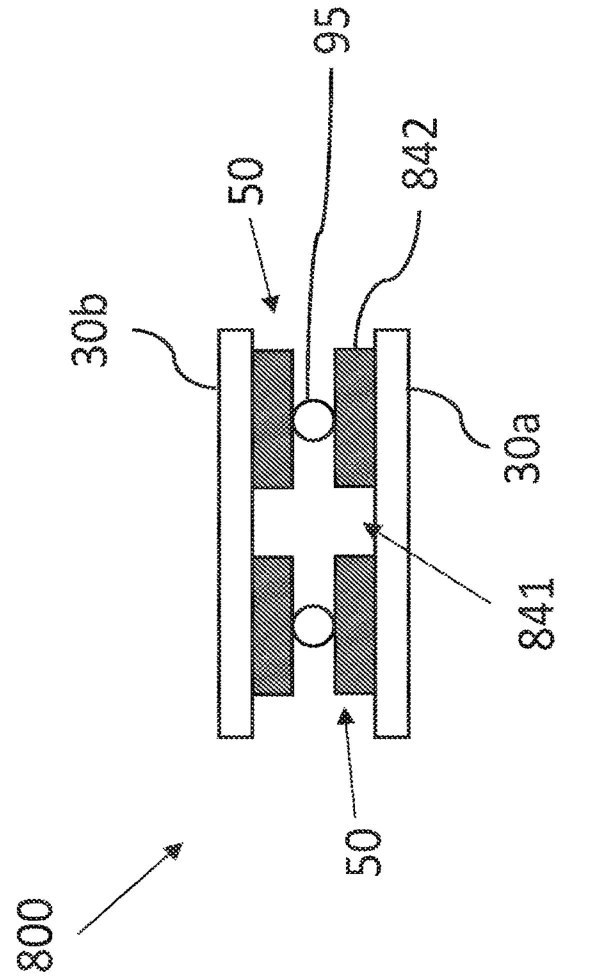
FIG. 8B shows a close-up of a coating and spacer beads of the liquid crystal contact lens of FIG. 8A.

FIGS. 8A and 8B show a liquid crystal contact lens 800 with spacer beads 95 which may be used in combination with the methods disclosed above to enable oxygen to permeate through the contact lens 800. As described above, the liquid crystal contact lens 800 may include a liquid crystal layer 35 made up of a liquid crystal material, a first substrate 30*a*, and a second substrate 30*b*. As shown in FIG. 8A, the liquid crystal layer 35 may be disposed between the first substrate 30*a* and the second substrate 30*b*, trapping the liquid material between the two sections. One or more of the substrates (30*a* and 30*b*) may be patterned (e.g., in the shape of a Fresnel lens) or have one or more refractive and/or diffractive structures to provide static optical power. The first and/or second substrate surfaces may also be coated with additional layers, such as coating 50. As described above, coating 50 may be made of an oxygen non-permeable material. For example, the coating may be made of indium tin oxide (ITO), silicon dioxide ($SiO_2$), or a combination of ITO and $SiO_2$. The coating 50 may be electrically connected to an electrical source (not shown) to ensure proper operation of the liquid crystal contact lens 800. The coating 50 may include one or more pores or holes 841 as described above to enable oxygen to permeate through the coating 50.

As described above, the liquid crystal contact lens 800 may also include electrodes (not shown), a controller (not shown), electrical connections (not shown), and/or one or more alignment layers (not shown). The coating 50 may be in electrical communication with the liquid crystal layer 35. In operation, a conducive layer of the coating 50 may apply an electric field to the liquid crystal layer 35 that may modulate the liquid crystal material's refractive index, changing the liquid crystal lens's optical power (i.e., the degree to which the liquid crystal contact lens focuses incident light). A controller (not shown) may be adapted for electrically driving the coating 50 (e.g., via buss lines, electrodes, and/or resistive bridges, not shown) for modulating the electric field applied to the liquid crystal layer 35 and the optical power of the liquid crystal lens 800.

FIG. 8B shows a zoomed-in section of FIG. 8A, allowing better visualization of the spacer beads 95 and the coating 50. As shown in FIG. 8B, the spacer beads 155 may prevent contact between the electrically conductive layers 842 of the coating 50 on the first and second substrates 30*a* and 30*b*. As shown in FIG. 8B, the liquid crystal contact lens 800 may include one or more spacer beads 95 to separate the coating 50 on the first substrate 30*a* from the coating 50 on the second substrate 30*b*. For example, the spacer beads 95 may be used instead of, or in addition to, the insulating layer(s) to prevent the coatings 50 on the first and second substrates 30*a* and 30*b* from short circuiting. The spacer beads 95 may in some instances extend into the liquid crystal layer 35 without degrading the optical performance of the liquid crystal contact lens 800. Instead of, or in addition to, in between coatings 50 on the first and second substrates 30*a* and 30*b*, the spacer beads 95 may also be used to separate one or more layers of the coating 50.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A liquid crystal contact lens comprising:

a first oxygen-permeable substrate, wherein a first side of the first oxygen-permeable substrate is configured to be placed on a mammalian eye;

a second oxygen-permeable substrate configured to be placed proximate to a second side of the first oxygen-permeable substrate to form a cavity between the first oxygen-permeable substrate and the second oxygen-permeable substrate;

a liquid crystal material disposed within the cavity; and an oxygen-impermeable coating disposed on the second side of the first oxygen-permeable substrate facing the cavity, wherein a portion of the oxygen-impermeable coating has been removed to allow oxygen to travel directly between the liquid crystal material and the first oxygen-permeable substrate and to permeate through the liquid crystal contact lens to the mammalian eye, wherein the oxygen-impermeable coating comprises:

a first insulating layer disposed directly on the second side of the first oxygen-permeable substrate;

a conductive layer disposed on the first insulating layer; and a second insulating layer disposed on the conductive layer.

2. The liquid crystal contact lens of claim 1, wherein the first insulating layer and the second insulating layer each comprise silicon dioxide ($SiO_2$).

3. The liquid crystal contact lens of claim 1, wherein the conductive layer comprises indium tin oxide (ITO).

4. The liquid crystal contact lens of claim 1, wherein the oxygen-impermeable coating further comprises:

a liquid-crystal alignment layer disposed on the second insulating layer.

5. The liquid crystal contact lens of claim 1, wherein at least one of the first oxygen-permeable substrate or the second oxygen-permeable substrate comprise a surface relief diffractive pattern.

6. The liquid crystal contact lens of claim 5, wherein the surface relief diffractive pattern comprises a Fresnel lens pattern.

7. The liquid crystal contact lens of claim 6, wherein the portion of the oxygen-impermeable coating that has been removed comprises at least one region between a pair of adjoining rings in the Fresnel lens pattern.

8. The liquid crystal contact lens of claim 1, wherein the portion of the oxygen-impermeable coating that has been removed comprises a plurality of ablation zones.

9. The liquid crystal contact lens of claim 8, wherein the plurality of ablation zones comprises about 10 to about 1000 ablation zones.

10. The liquid crystal contact lens of claim 1, wherein the oxygen-impermeable coating is a first oxygen-impermeable coating, and further comprising:

a second oxygen-impermeable coating disposed on a first side of the second oxygen-permeable substrate facing the cavity, wherein a portion of the second oxygen-impermeable coating has been removed to allow oxygen to travel directly between the liquid crystal material and the second oxygen-permeable substrate and to permeate through the liquid crystal contact lens to the mammalian eye.

11. A method of manufacturing an oxygen permeable liquid crystal contact lens, the method comprising:

applying a coating to a surface of a first oxygen-permeable substrate configured to be placed on a mammalian eye, wherein the coating comprises an oxygen-impermeable material and applying the coating comprises:

disposing a first insulating layer on the surface of the first oxygen-permeable substrate;

disposing a conductive layer on the first insulating layer; and disposing a second insulating layer on the conductive layer;

removing a portion of the coating to allow oxygen to permeate through the coating to the first oxygen-permeable substrate and through the contact lens to the mammalian eye;

forming a cavity between the first oxygen-permeable substrate and a second oxygen-permeable substrate; and disposing a liquid crystal material within the cavity facing the coating.

12. The method of claim 11, wherein applying the coating further comprises:

disposing a liquid-crystal alignment layer on the second insulating layer.

13. The method of claim 11, wherein the removing the portion of the coating comprises at least one of laser etching, electron beam etching, ultrasonic shaking, ablating, ion milling, or reactive ion etching the coating.

14. The method of claim 11, further comprising:

patterning a surface relief pattern diffractive pattern on the first oxygen-permeable substrate prior to applying the coating to the first oxygen-permeable substrate.

15. The method of claim 11, wherein the coating is a first coating, and further comprising, before forming the cavity:

applying a second coating to a surface of the second oxygen-permeable substrate, wherein the second coating comprises additional oxygen-impermeable material; and removing a portion of the second coating to allow oxygen to permeate through the coating to the second oxygen-permeable substrate and through the contact lens to the mammalian eye.

16. A method of manufacturing an oxygen permeable liquid crystal contact lens, the method comprising:

disposing a first conductive layer on a first portion of a first oxygen-permeable substrate configured to be placed on a mammalian eye, wherein a second portion of the first oxygen-permeable substrate is exposed to allow oxygen to permeate through the contact lens to the mammalian eye;

disposing a second conductive layer on a first portion of a second oxygen-permeable substrate configured to be placed on a mammalian eye, wherein a second portion of the first oxygen-permeable substrate is exposed to allow oxygen to permeate through the contact lens to the mammalian eye;

forming a cavity between the first oxygen-permeable substrate and the second oxygen-permeable substrate;

disposing a plurality of spacer beads within the cavity, wherein the plurality of spacer beads are configured to prevent the first conductive layer from contacting the second conductive layer; and disposing a liquid crystal material within the cavity.

17. The method of claim 16, further comprising, before forming the cavity:

disposing a liquid-crystal alignment layer on the first conductive layer or the second conductive layer.

18. The method of claim 16, wherein the first portion of the first oxygen-permeable substrate and the first portion of a second oxygen-permeable substrate do not overlap to allow oxygen to travel directly through the first oxygen-permeable substrate, the liquid crystal material, and the second oxygen-permeable substrate to the mammalian eye.

19. A liquid crystal contact lens comprising:

a first oxygen-permeable substrate, wherein a first side of the first oxygen-permeable substrate is configured to be placed on a mammalian eye;

a second oxygen-permeable substrate configured to be placed proximate to a second side of the first oxygen-permeable substrate to form a cavity between the first oxygen-permeable substrate and the second oxygen-permeable substrate;

a liquid crystal material disposed within the cavity; and a porous coating disposed on the second side of the first oxygen-permeable substrate facing the cavity, wherein the porous coating comprises at least one oxygen non-permeable material with a plurality of holes extending through the porous coating to allow oxygen to travel between the liquid crystal material and the first oxygen-permeable substrate via the plurality of holes.

20. The liquid crystal contact lens of claim 19, wherein the porous coating is a first porous coating, and further comprising:

a second porous coating disposed on a first side of the second oxygen-permeable substrate facing the cavity, wherein the second porous coating comprises at least one oxygen non-permeable material with a plurality of holes extending through the second porous coating to allow oxygen to travel between the liquid crystal material and the second oxygen-permeable substrate via the plurality of holes.

21. A method of manufacturing an oxygen permeable liquid crystal contact lens, the method comprising:

applying an oxygen non-permeable material to a surface of a first oxygen-permeable substrate configured to be placed on a mammalian eye;

patterning the oxygen non-permeable material with a plurality of holes extending through the oxygen non-permeable material to the surface of the first oxygen-permeable substrate;

forming a cavity between the first oxygen-permeable substrate and a second oxygen-permeable substrate; and disposing a liquid crystal material within the cavity facing the oxygen non-permeable material.

22. The method of claim 21, wherein the patterning the oxygen non-permeable material comprises ablating the oxygen non-permeable material.

23. The method of claim 21, wherein the oxygen non-permeable material is a first oxygen non-permeable material, and further comprising, before forming the cavity:

applying a second oxygen non-permeable material to a surface of the second oxygen-permeable substrate; and patterning the second oxygen non-permeable material with a plurality of holes extending through the second oxygen non-permeable material to the surface of the second oxygen-permeable substrate.

24. A liquid crystal contact lens comprising:

a first oxygen-permeable substrate, wherein a first side of the first oxygen-permeable substrate is configured to be placed on a mammalian eye;

a second oxygen-permeable substrate configured to be placed proximate to a second side of the first oxygen-permeable substrate to form a cavity between the first oxygen-permeable substrate and the second oxygen-permeable substrate;

a liquid crystal material disposed within the cavity; and a coating comprising:

a first insulating layer disposed directly on the second side of the first oxygen-permeable substrate facing the cavity;

a conductive layer disposed on the first insulating layer;

a second insulating layer disposed on the conductive layer; and a plurality of pores extending through the first insulating layer, the conductive layer, and the second insulating layer to allow oxygen to travel through the second oxygen-permeable substrate, the liquid crystal material, and the first oxygen-permeable substrate via the plurality of pores to reach the mammalian eye.

* * * * *